US011974090B1

(12) United States Patent
Roberts, Jr. et al.

(10) Patent No.: US 11,974,090 B1
(45) Date of Patent: Apr. 30, 2024

(54) HEADPHONE EAR CUSHION ATTACHMENT MECHANISM AND METHODS FOR USING

(71) Applicant: Sonos, Inc., Santa Barbara, CA (US)

(72) Inventors: Ronald W. Roberts, Jr., Cambridge, MA (US); Patrice Billaudet, Vienna (AT); Dieter Rapitsch, Wiener Neustadt (AT)

(73) Assignee: Sonos Inc., Santa Barbara, CA (US)

( * ) Notice: Subject to any disclaimer, the term of this patent is extended or adjusted under 35 U.S.C. 154(b) by 0 days.

(21) Appl. No.: 18/068,460

(22) Filed: Dec. 19, 2022

Related U.S. Application Data

(63) Continuation of application No. 17/450,431, filed on Oct. 8, 2021, now Pat. No. 11,533,564.

(60) Provisional application No. 63/089,423, filed on Oct. 8, 2020.

(51) Int. Cl.
*H04R 1/10* (2006.01)

(52) U.S. Cl.
CPC ......... *H04R 1/1058* (2013.01); *H04R 1/1008* (2013.01)

(58) Field of Classification Search
CPC ............................ H04R 1/1058; H04R 1/1008
See application file for complete search history.

(56) References Cited

U.S. PATENT DOCUMENTS 1,396,771 A 11/1921 Minton
1,615,028 A 1/1927 Morser
1,648,832 A 11/1927 Urban
2,420,245 A 5/1947 Hurst
2,782,423 A 2/1957 Simon et al.
2,862,671 A 12/1958 Dimond
3,051,961 A 9/1962 Clark
(Continued)

FOREIGN PATENT DOCUMENTS

CN 306928266 S 11/2021
CN 307129808 S 2/2022
(Continued)

OTHER PUBLICATIONS

"Get Navi", Gakken Publishing Co., Ltd., HA30004687, Jul. 30, 2018, vol. 20, No. 9, p. 3.
(Continued)

*Primary Examiner* — Andrew L Sniezek
(74) *Attorney, Agent, or Firm* — Workman Nydegger

(57) ABSTRACT

Systems and methods for securing a headphone ear cushion to a headphone earcup on a headphone are described. One embodiment includes orienting an ear cushion proximate to, but not touching, an earcup of a headphone, where the ear cushion includes an attachment ring, the earcup including an attachment receiving interface, aligning a first slot in the attachment ring with a first inward-facing hook on the attachment receiving interface, aligning a first notch with a first outward-facing hook and a second notch with a second outward-facing hook, pressing the attachment ring against the attachment receiving interface such that the first inward-facing hook passes through the first slot, the first outward-facing hook passes through the first notch, and the second outward-facing hook passes through the second notch, and sliding the first elliptical ring relative to the second elliptical ring.

8 Claims, 46 Drawing Sheets

(56) References Cited

U.S. PATENT DOCUMENTS

| | | | |
|---|---|---|---|
| 3,220,505 | A | 11/1965 | Hargrave |
| 3,454,964 | A | 7/1969 | Brinkhoff |
| 3,530,509 | A | 9/1970 | Simpson et al. |
| 3,588,914 | A | 6/1971 | Ihnat, Jr. |
| 3,596,733 | A | 8/1971 | Bertagni |
| D222,547 | S | 11/1971 | Kantor |
| D235,210 | S | 5/1975 | Hill |
| D239,787 | S | 5/1976 | Lonstedt |
| D244,300 | S | 5/1977 | Besasie |
| D254,616 | S | 4/1980 | Tabata |
| 4,385,209 | A | 5/1983 | Greason et al. |
| 4,465,159 | A | 8/1984 | Stallings |
| D276,855 | S | 12/1984 | Falco |
| D299,337 | S | 1/1989 | Wiegel |
| D313,092 | S | 12/1990 | Nilsson |
| 5,018,599 | A | 5/1991 | Dohi et al. |
| 5,035,005 | A | 7/1991 | Hung |
| D322,071 | S | 12/1991 | Bergin et al. |
| D328,074 | S | 7/1992 | Yamazaki et al. |
| 5,144,678 | A | 9/1992 | Lenz |
| 5,233,650 | A | 8/1993 | Chan |
| 5,243,709 | A | 9/1993 | Sheehan et al. |
| 5,293,647 | A | 3/1994 | Mirmilshteyn et al. |
| 5,384,857 | A | 1/1995 | Nordin et al. |
| 5,500,958 | A | 3/1996 | Falco |
| 5,640,458 | A | 6/1997 | Nishiguchi et al. |
| D385,665 | S | 10/1997 | Westerdal |
| 5,786,593 | A | 7/1998 | Ohtomo et al. |
| 5,996,123 | A | 12/1999 | Leight et al. |
| D431,550 | S | 10/2000 | Yoneda |
| 6,236,969 | B1 | 5/2001 | Ruppert et al. |
| 6,449,806 | B1 | 9/2002 | Engelhard et al. |
| D505,411 | S | 5/2005 | Sakai |
| 6,993,143 | B2 | 1/2006 | Harris et al. |
| D538,261 | S | 3/2007 | Taylor et al. |
| D544,650 | S | 6/2007 | Westerdal |
| D573,581 | S | 7/2008 | Gondo et al. |
| D576,604 | S | 9/2008 | Suzuki |
| D582,890 | S | 12/2008 | Koza et al. |
| D589,492 | S | 3/2009 | Mistry |
| D603,370 | S | 11/2009 | Suzuki |
| D625,705 | S | 10/2010 | Ohori et al. |
| D633,895 | S | 3/2011 | Morimoto |
| D635,959 | S | 4/2011 | Hutchieson |
| D637,497 | S | 5/2011 | Lee |
| D638,397 | S | 5/2011 | Mcmanigal |
| 8,006,320 | B1 | 8/2011 | Rohbani |
| D649,527 | S | 11/2011 | Lee et al. |
| D649,956 | S | 12/2011 | Gresko et al. |
| D651,586 | S | 1/2012 | Lee et al. |
| 8,098,872 | B2 | 1/2012 | Chang |
| D657,344 | S | 4/2012 | Brunner et al. |
| D657,345 | S | 4/2012 | Brunner et al. |
| 8,234,395 | B2 | 7/2012 | Millington |
| D666,992 | S | 9/2012 | Lee et al. |
| D668,633 | S | 10/2012 | Enquist |
| 8,295,529 | B2 | 10/2012 | Petersen et al. |
| D672,744 | S | 12/2012 | Scarpa |
| D672,745 | S | 12/2012 | Abed et al. |
| D672,875 | S | 12/2012 | Ishibashi et al. |
| D678,859 | S | 3/2013 | Lee |
| D683,329 | S | 5/2013 | Hagelin |
| D684,141 | S | 6/2013 | Takamoto |
| 8,483,853 | B1 | 7/2013 | Lambourne |
| D688,649 | S | 8/2013 | Combs et al. |
| D691,583 | S | 10/2013 | Kitayama |
| D697,048 | S | 1/2014 | Pavitsich |
| D697,897 | S | 1/2014 | Lee et al. |
| D699,702 | S | 2/2014 | Chen |
| 8,755,555 | B2 | 6/2014 | Dougherty et al. |
| D708,163 | S | 7/2014 | Ishikura |
| 8,767,996 | B1 | 7/2014 | Lin et al. |
| 8,774,442 | B2 | 7/2014 | Huang |
| 8,818,011 | B2 | 8/2014 | Chen |
| D729,193 | S | 5/2015 | Kirsch et al. |
| D733,090 | S | 6/2015 | Petersen |
| D736,176 | S | 8/2015 | Rapitsch |
| D739,842 | S | 9/2015 | Birger |
| D750,041 | S | 2/2016 | Birger |
| 9,344,794 | B1 | 5/2016 | Blonder |
| D763,226 | S | 8/2016 | Petersen |
| D787,469 | S | 5/2017 | Djohar et al. |
| D787,470 | S | 5/2017 | Kelly et al. |
| D800,691 | S | 10/2017 | Ando et al. |
| D813,837 | S | 3/2018 | Paterson |
| D815,615 | S | 4/2018 | Wernblad |
| 10,027,299 | B2 | 7/2018 | Rose et al. |
| D826,894 | S | 8/2018 | Zhang |
| D826,895 | S | 8/2018 | Sharp et al. |
| D830,222 | S | 10/2018 | Silvestri |
| D830,333 | S | 10/2018 | Carr |
| D830,334 | S | 10/2018 | Carr |
| D833,071 | S | 11/2018 | Pennington et al. |
| D837,763 | S | 1/2019 | Suzuki |
| D838,687 | S | 1/2019 | Wu |
| D840,971 | S | 2/2019 | Summerson et al. |
| D842,270 | S | 3/2019 | Chen |
| D849,712 | S | 5/2019 | Billaudet et al. |
| D851,622 | S | 6/2019 | Billaudet et al. |
| D851,839 | S | 6/2019 | Scanlon |
| D857,652 | S | 8/2019 | Wang |
| D858,481 | S | 9/2019 | Saule et al. |
| D859,353 | S | 9/2019 | Wagner |
| D860,163 | S | 9/2019 | Xia |
| 10,405,081 | B2 | 9/2019 | Hviid et al. |
| D861,636 | S | 10/2019 | Carr |
| D868,025 | S | 11/2019 | Brace |
| D871,368 | S | 12/2019 | Saule et al. |
| D872,049 | S | 1/2020 | Saule et al. |
| D876,388 | S | 2/2020 | Carr et al. |
| D877,714 | S | 3/2020 | Dhondt et al. |
| D878,327 | S | 3/2020 | Dhondt et al. |
| D881,475 | S | 4/2020 | Xu |
| 10,694,309 | B1 | 6/2020 | Vautrin et al. |
| D890,123 | S | 7/2020 | Yoshimura |
| D891,397 | S | 7/2020 | Zeng |
| 10,757,499 | B1 | 8/2020 | Vautrin et al. |
| D900,782 | S | 11/2020 | Vaclavik et al. |
| D902,496 | S | 11/2020 | Bui |
| D905,005 | S | 12/2020 | Liu |
| D909,988 | S | 2/2021 | Vaclavik et al. |
| D913,990 | S | 3/2021 | Saule et al. |
| D918,171 | S | 5/2021 | Nakayama et al. |
| D920,283 | S | 5/2021 | Levine et al. |
| D928,114 | S | 8/2021 | Terazaki |
| D934,198 | S | 10/2021 | Michaelian et al. |
| 11,153,678 | B1 | 10/2021 | Jorgovanovic et al. |
| 11,184,696 | B1 | 11/2021 | Li et al. |
| D938,934 | S | 12/2021 | Tsubone et al. |
| D944,759 | S | 3/2022 | Vaclavik |
| 11,265,640 | B2 | 3/2022 | Peeters et al. |
| 11,290,825 | B1 | 3/2022 | Ko et al. |
| D954,019 | S | 6/2022 | Shyu et al. |
| D961,545 | S | 8/2022 | Ahovi et al. |
| 11,533,564 | B2 * | 12/2022 | Roberts, Jr. .......... H04R 1/1008 |
| D974,327 | S | 1/2023 | Shyu et al. |
| D985,529 | S | 5/2023 | Wagner |
| D986,215 | S | 5/2023 | Jörgensen |
| D991,214 | S | 7/2023 | Roberts, Jr. et al. |
| 2002/0159833 | A1 | 10/2002 | Nabeshima |
| 2006/0027245 | A1 | 2/2006 | Spector |
| 2009/0041285 | A1 | 2/2009 | Parkins et al. |
| 2010/0158301 | A1 | 6/2010 | Kuhtz et al. |
| 2010/0180754 | A1 | 7/2010 | Brown et al. |
| 2011/0123059 | A1 | 5/2011 | Hu |
| 2011/0182454 | A1 | 7/2011 | Larsen et al. |
| 2013/0034259 | A1 | 2/2013 | Xiong et al. |
| 2014/0111415 | A1 | 4/2014 | Gargi et al. |
| 2014/0363016 | A1 | 12/2014 | Blonder |
| 2015/0222977 | A1 | 8/2015 | Angel, Jr. |
| 2015/0378546 | A1 | 12/2015 | Osborne et al. |
| 2016/0050486 | A1 | 2/2016 | Uggla |
| 2016/0193085 | A1 | 7/2016 | Jenkins et al. |
| 2016/0210956 | A1 | 7/2016 | Huang |

(56) References Cited

U.S. PATENT DOCUMENTS

| | | | |
|---|---|---|---|
| 2017/0192739 A1 | 7/2017 | Gossain et al. | |
| 2017/0230746 A1 | 8/2017 | Silvestri | |
| 2017/0242653 A1 | 8/2017 | Lang et al. | |
| 2017/0330539 A1 | 11/2017 | Little et al. | |
| 2018/0069815 A1 | 3/2018 | Fontana et al. | |
| 2018/0107446 A1 | 4/2018 | Wilberding et al. | |
| 2019/0069074 A1 | 2/2019 | Yamkovoy | |
| 2019/0104353 A1* | 4/2019 | Ishikawa | H04R 1/1008 |
| 2019/0189106 A1 | 6/2019 | Hull et al. | |
| 2019/0189196 A1 | 6/2019 | Robison et al. | |
| 2019/0313179 A1 | 10/2019 | Saule et al. | |
| 2020/0077172 A1 | 3/2020 | England et al. | |
| 2020/0322709 A1 | 10/2020 | Schoeck et al. | |
| 2020/0322710 A1 | 10/2020 | Peeters et al. | |
| 2020/0387719 A1 | 12/2020 | Jung | |
| 2020/0389719 A1 | 12/2020 | Morris et al. | |
| 2021/0100689 A1 | 4/2021 | Himuro et al. | |
| 2022/0014837 A1 | 1/2022 | Kikuchi et al. | |
| 2022/0116708 A1 | 4/2022 | Roberts, Jr. et al. | |
| 2022/0279267 A1 | 9/2022 | Johnson et al. | |
| 2023/0164488 A1 | 5/2023 | Degner et al. | |

FOREIGN PATENT DOCUMENTS

| | | | |
|---|---|---|---|
| EM | 008306104-0001 | 12/2020 | |
| EM | 008306104-0002 | 12/2020 | |
| EM | 008306104-0003 | 12/2020 | |
| EM | 008306104-0004 | 12/2020 | |
| EM | 008306104-0005 | 12/2020 | |
| EM | 008306104-0006 | 12/2020 | |
| EM | 008308431-0001 | 12/2020 | |
| EM | 008308431-0002 | 12/2020 | |
| EM | 008308431-0003 | 12/2020 | |
| EM | 008308431-0004 | 12/2020 | |
| EM | 008308431-0005 | 12/2020 | |
| EM | 008308431-0006 | 12/2020 | |
| EM | 008308431-0007 | 12/2020 | |
| EM | 008308431-0008 | 12/2020 | |
| EM | 008313035-0001 | 12/2020 | |
| EM | 008507867-0001 | 4/2021 | |
| EM | 009101447-0001 | 7/2022 | |
| EP | 3920549 A1 * | 12/2021 | |
| GB | 9003743228-0001 | 2/2017 | |
| GB | 9008057400-0001 | 7/2020 | |
| GB | 9008306104-0001 | 12/2020 | |
| GB | 9008306104-0002 | 12/2020 | |
| GB | 9008306104-0003 | 12/2020 | |
| GB | 9008306104-0004 | 12/2020 | |
| GB | 9008306104-0005 | 12/2020 | |
| GB | 9008306104-0006 | 12/2020 | |
| GB | 9008308431-0004 | 12/2020 | |
| IN | 334368-001-0001 | 10/2020 | |
| JP | 05292589 A * | 11/1993 | H04B 7/14 |
| JP | 1502702 S | 6/2014 | |
| JP | 1526957 S | 5/2015 | |
| JP | 1617671 S | 10/2018 | |
| JP | 1673628 S | 11/2020 | |
| JP | 1701262 S | 11/2021 | |
| JP | 1706404 S | 1/2022 | |
| JP | 1730548 S | 11/2022 | |
| JP | 1751758 S | 8/2023 | |

OTHER PUBLICATIONS

"Premium Headphone Guide Magazine", Ongen Publishing Co., Ltd., RA02005238, May 25, 2020, vol. 14, p. 87, 3 pages.

Ali, "B&O Beoplay H8i review", techradar, Apr. 23, 2018, retrieved from https://www.techradar.com/reviews/bando-beoplay-h8i on Aug. 20, 2020, 21 pgs.

Bernard, "The Bowers & Wilkins PX headphones offer big sound at a high price", techcrunch, Jan. 22, 2018, retrieved from https://techcrunch.com/2018/01/22/review-bowers-and-wilkins-px-wireless-headphones/ on Aug. 21, 2020, 13 pgs.

Bhalla, "Bose Quiet Comfort 35 II Review: Easily The Best Wireless Noise-Cancelling Headphones Yet", mensxp, Jan. 26, 2018, retrieved from https://www.mensxp.com/technology/reviews/42230-bose-quiet-comfort-35-ii-review-easily-the-best-wireless-noise-cancelling-headphones-yet.html on Aug. 20, 2020, 24 pgs.

Carnoy, "Microsoft Surface Headphones: Hands-on with Microsoft's new Bose-buster noise-canceling headphones", cnet, Oct. 2, 2018, retrieved from https://www.cnet.com/reviews/microsoft-surface-headphones-preview/ on Aug. 20, 2020, 12 pgs.

Krol, "Beoplay H4 review: Pricey, but you can hear what you pay for", Mashable, Jul. 5, 2018, retrieved from https://mashable.com/2018/07/05/beoplay-h4-review/ on Aug. 20, 2020, 26 pgs.

Savov, "Sony 1000X M3 Review: Supreme Noise Canceling", The Verge, Sep. 11, 2018, retrieved from https://www.theverge.com/2018/9/11/17844914/sony-1000x-m3-review-noise-canceling-headphones on Aug. 20, 2020, 11 pgs.

Stark, "Beats' best: Beats Studio 3 Wireless reviewed", pickr, May 31, 2018, retrieved from https://www.pickr.com.au/reviews/2018/beats-studio-3-wireless-headphones/ on Aug. 20, 2020, 25 pgs.

Steele, "B&O Beoplay H8i and H9i headphones review: Diminishing returns", engadget, Apr. 28, 2018, retrieved from https://www.engadget.com/2018-04-28-bang-olufsen-beoplay-h8i-h9i-headphones-review.html on Aug. 20, 2020, 25 pgs.

"Bluetooth Headest 2018 Products Catalogue", Saiyo Electronics Co., Ltd, Patent Office Design Division publication No. HD30005951, Oct. 17, 2018, p. 5, 3 pgs.

* cited by examiner

Fig. 16
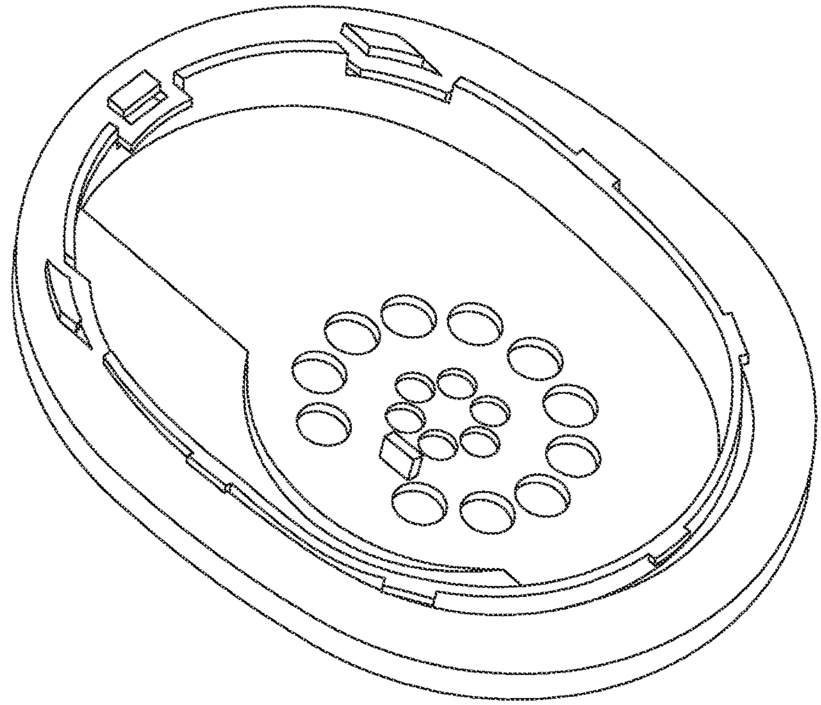
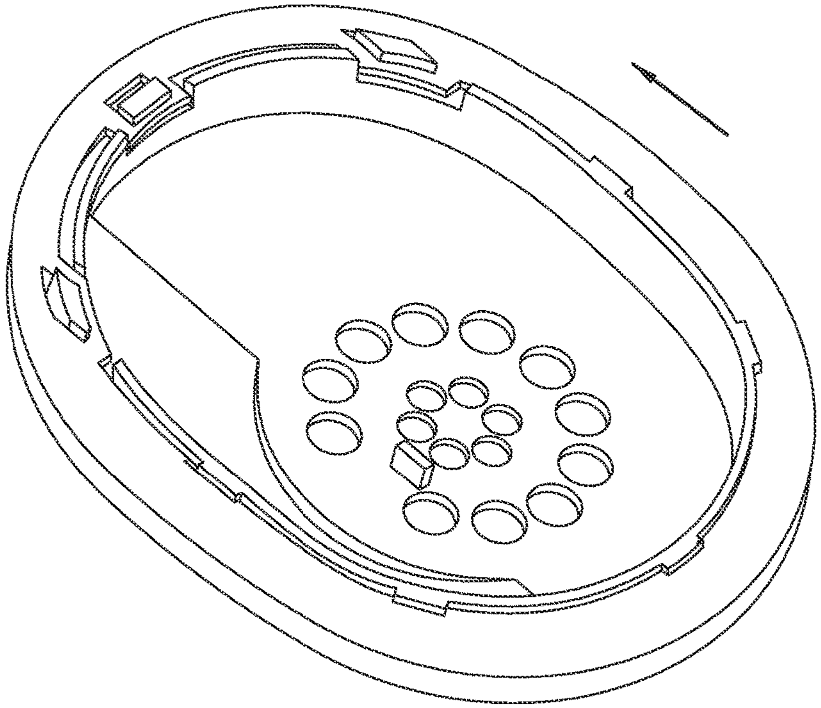
Fig. 17

HEADPHONE EAR CUSHION ATTACHMENT MECHANISM AND METHODS FOR USING

RELATED APPLICATIONS

The present application is a continuation of U.S. patent application Ser. No. 17/450,431, entitled "Headphone Ear Cushion Attachment Mechanism and Methods for Using" to Roberts et al., filed Oct. 8, 2021, which claims priority to U.S. Patent Application No. 63/089,423, entitled "Headphone Ear Cushion Attachment Mechanism and Methods for Using" to Roberts et al., filed Oct. 8, 2020, the disclosure of which is hereby incorporated by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

SUMMARY OF THE INVENTION

Mechanisms and methods for securing an ear cushion to a headphone are disclosed.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIGS. 16 and 17 illustrate a receiver frame of a headphone ear cushion and attachment frame of a headphone earcup in accordance with certain embodiments of the invention.

Figure 1A:
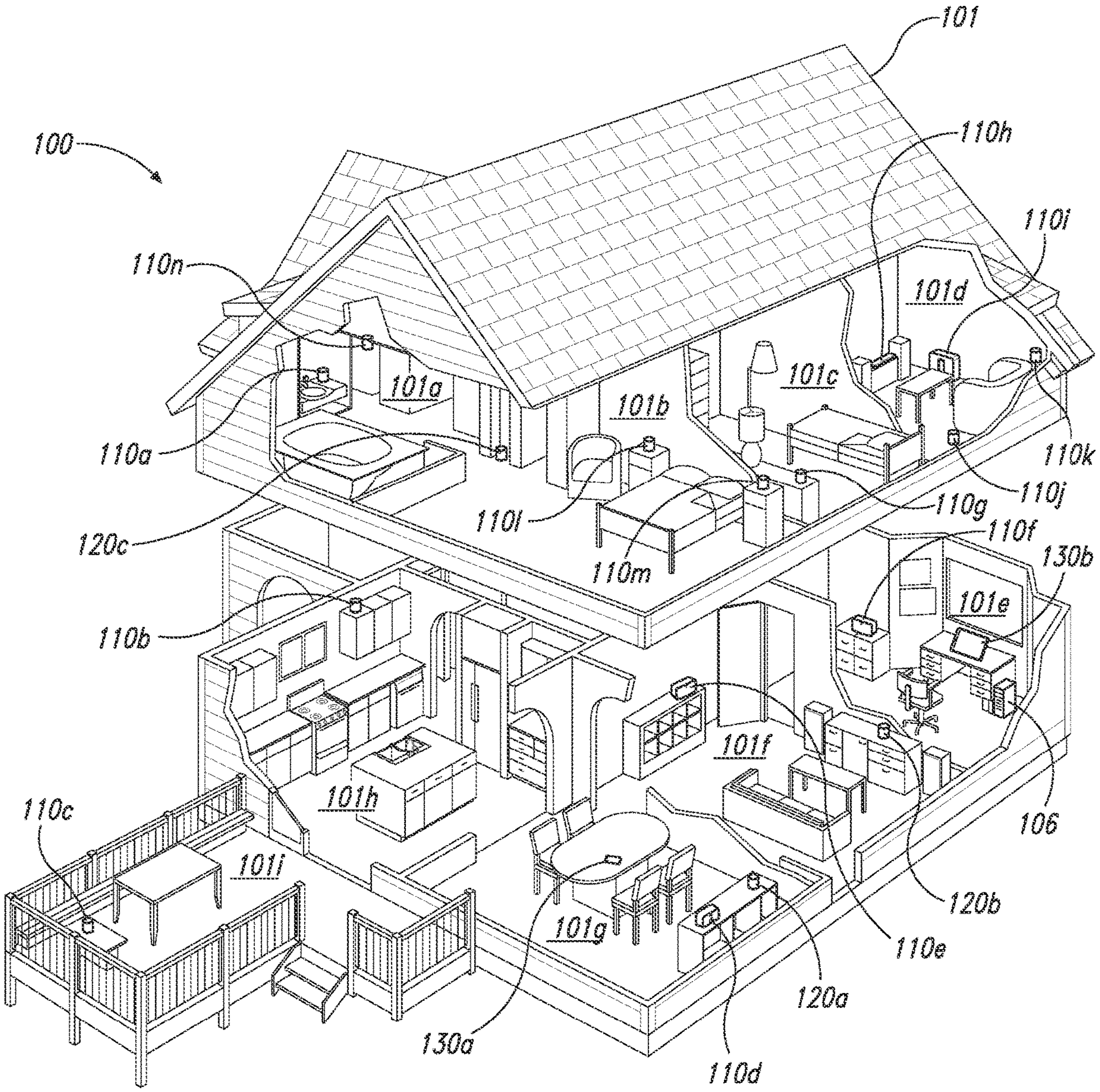
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments described herein relate to attachment mechanisms to secure an ear cushion to a headphone, which may be wired and/or wireless.

Headphones in accordance with some embodiments of the invention may be wireless and utilize digital communications over a wireless link (e.g., Bluetooth, WiFi, etc.) to receive audio data from any of a variety of media sources. Media may be received by a wireless headphone from a separate computing device, such as a personal computer, smartphone, or tablet or a playback device, such as a smart speaker or smart television. Media may also be received by the wireless headphone from a media streaming service, such as Spotify, iTunes, or Amazon, etc. Wireless headphones may further have onboard storage for media as well. Wired headphones in contrast utilize a wire or cord to receive a digital or analog audio signal that is output from a source device.

Playback of audio in a headphone typically utilizes one or more audio drivers within each earcup to create sound waves that travel to a user's ear. An ear cushion is usually attached to each earcup that helps to create a seal to keep sound waves from escaping when the ear cushion rests against the user's head. Often an ear cushion can degrade or wear out over time. Therefore, it can be useful for ear cushions to be removeable and replaceable. Attachment mechanisms in accordance with many embodiments of the invention include one or more clips on an attachment frame and corresponding one or more slots in a receiver frame. The attachment frame can be on the earcup and the receiver frame can be on the ear cushion, or vice versa. Attachment frames and receiver frames for securing an ear cushion to an earcup of a headphone in accordance with embodiments of the invention are discussed in greater detail further below.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices 120 ("NMDs") (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term "NMD" (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100*a*) in synchrony with a second playback device (e.g., the playback device 100*b*). Interactions between the playback devices 110, NMDs 120, and/or control devices 130 of the media playback system 100 configured in accordance with the various embodiments of the disclosure are described in greater detail below with respect to FIGS. 1B-6.

In the illustrated embodiment of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed, to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the balcony 101*i*. In some aspects, a single playback zone may include multiple rooms or spaces. In certain aspects, a single room or space may include multiple playback zones.

In the illustrated embodiment of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E and 1I-1M.

In some aspects, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip hop music being played back by playback device 110*c* on the patio 101*i*. In some aspects, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
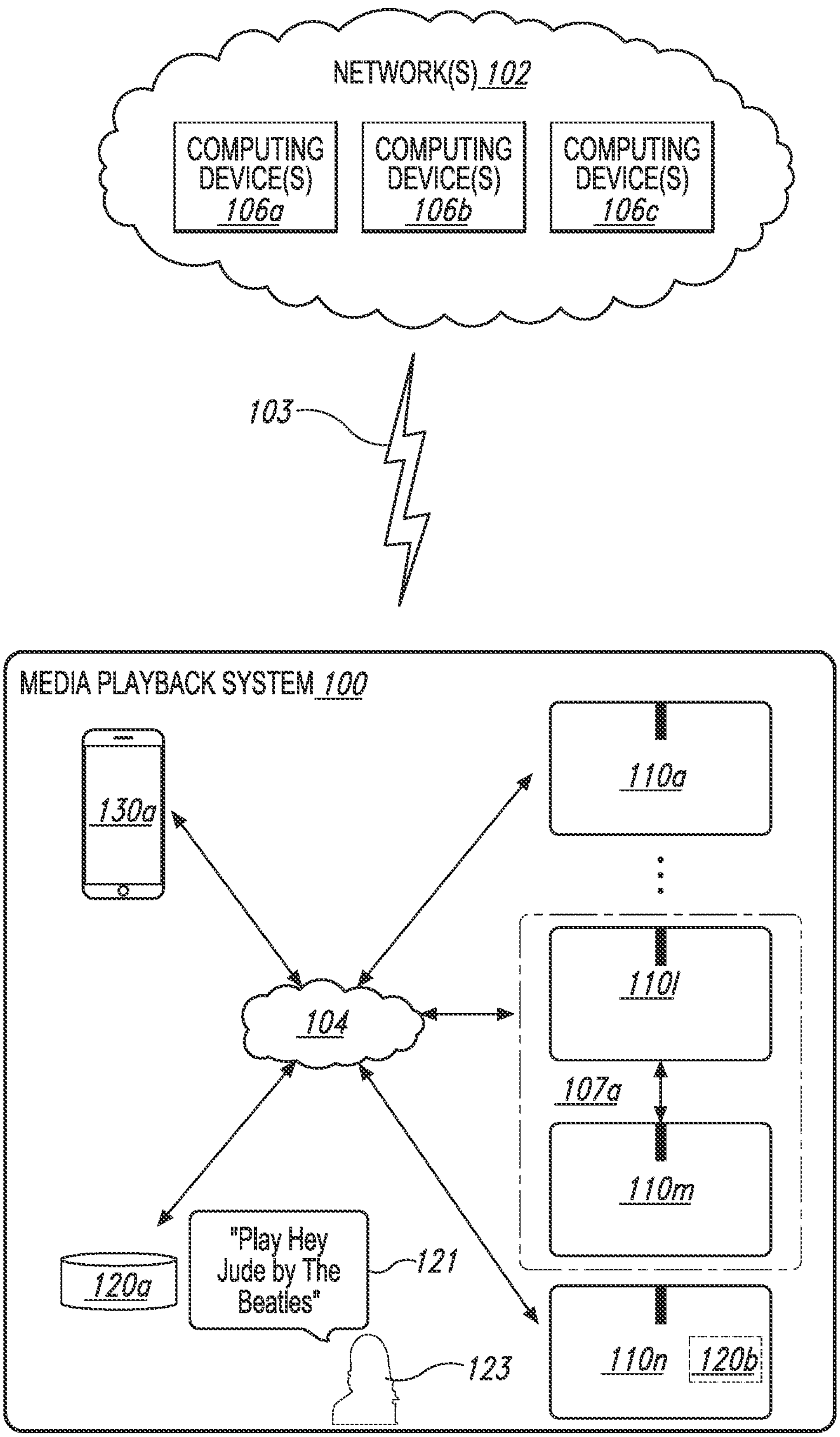
FIG. 1B is a schematic diagram of the media playback system of FIG. 1A and one or more networks.

FIG. 1B is a schematic diagram of the media playback system 100 and at least one cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. In many embodiments, a cloud network 102 is configured to deliver media content (e.g., audio content, video content, photographs, social media content) to the media playback system 100 in response to a request transmitted from the media playback system 100 via the links 103. In some embodiments, a cloud network 102 is configured to receive data (e.g., voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links. The network 104 may be referred to herein as a "local communication network" to differentiate the network 104 from the cloud network 102 that couples the media playback system 100 to remote devices, such as cloud services.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110. Additional details regarding groups and other arrangements of playback devices are described in further detail below with respect to FIGS. 1-I through IM.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) facilitate one or more operations on behalf of the media playback system 100.

In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103.

In response to receiving the voice input data, the computing device 106*c* processes the voice input data (i.e., "Play Hey Jude by The Beatles"), and determines that the processed voice input includes a command to play a song (e.g., "Hey Jude"). In some embodiments, after processing the voice input, the computing device 106*c* accordingly transmits commands to the media playback system 100 to play back "Hey Jude" by the Beatles from a suitable media service (e.g., via one or more of the computing devices 106) on one or more of the playback devices 110. In other embodiments, the computing device 106*c* may be configured to interface with media services on behalf of the media playback system 100. In such embodiments, after processing the voice input, instead of the computing device 106*c* transmitting commands to the media playback system 100 causing the media playback system 100 to retrieve the requested media from a suitable media service, the computing device 106*c* itself causes a suitable media service to provide the requested media to the media playback system 100 in accordance with the user's voice utterance.

b. Suitable Playback Devices

Figure 1C:
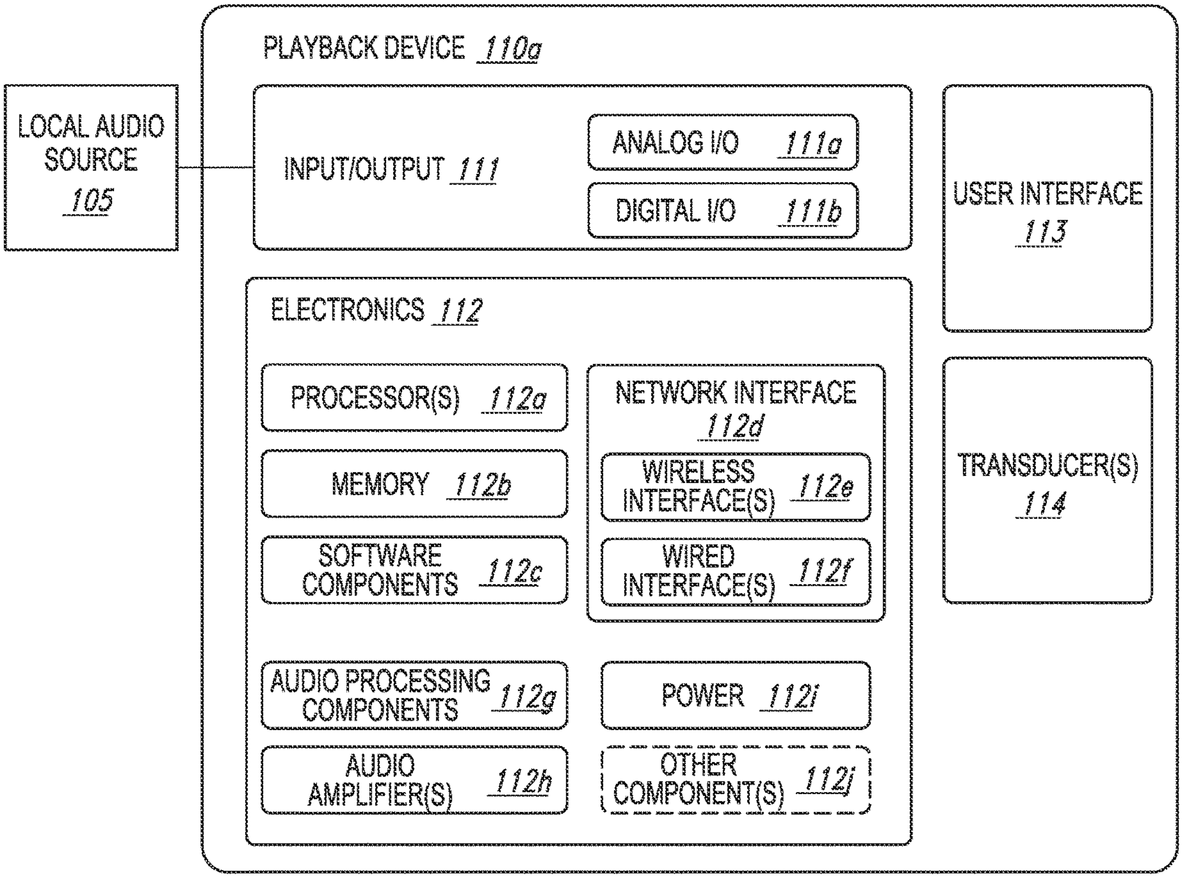
FIG. 1C is a block diagram of a playback device in accordance with certain embodiments of the invention.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises an High-Definition Multimedia Interface (HDMI) interface and/or cable. In some embodiments, the digital I/O 111*b* includes one or more wireless communication links comprising, for example, a radio frequency (RF), infrared, WiFi, Bluetooth, or another suitable communication protocol. In certain embodiments, the analog I/O 111*a* and the digital I/O 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 are configured to receive audio from an audio source (e.g., the local audio source 105) via the input/output 111 or one or more of the computing devices 106*a-c* via the network 104 (FIG. 1B)), amplify the received audio, and output the amplified audio for playback via one or more of the transducers 114. In some embodiments, the playback device 110*a* optionally includes one or more microphones 115 (e.g., a single microphone, a plurality of microphones, a microphone array) (hereinafter referred to as "the microphones 115"). In certain embodiments, for example, the playback device 110*a* having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some embodiments, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some embodiments, the operations further include causing the playback device 110*a* to send audio data to another one of the playback devices 110*a* and/or another device (e.g., one of the NMDs 120). Certain embodiments include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some embodiments, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated embodiment of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112*d* includes the wired interface 112*f* and excludes the wireless interface 112*e*. In some embodiments, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112*g* can comprise one or more subcomponents of the processors 112*a*. In some embodiments, the electronics 112 omits the audio processing components 112*g*. In some aspects, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some embodiments, for example, the amplifiers 112*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112*h* comprise a suitable combination of two or more of the foregoing types of power amplifiers. Moreover, in some embodiments, individual ones of the amplifiers 112*h* correspond to individual ones of the transducers 114. In other embodiments, however, the electronics 112 includes a single one of the amplifiers 112*h* configured to output amplified audio signals to a plurality of the transducers 114. In some other embodiments, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
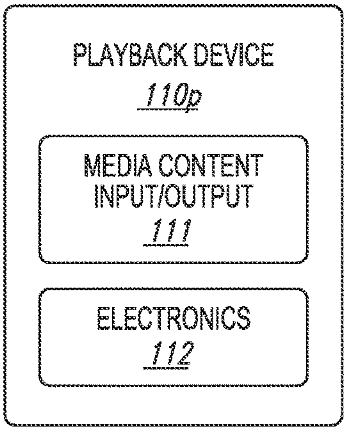
FIG. 1D is a block diagram of a playback device in accordance with certain embodiments of the invention.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110*p* comprising the input/output 111 and electronics 112 without the user interface 113 or transducers 114.

Figure 1E:
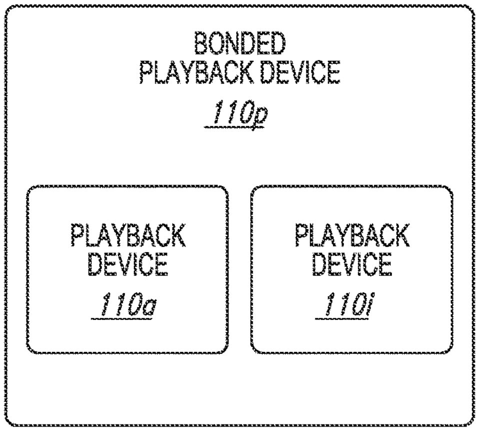
FIG. 1E is a block diagram of a network microphone device in accordance with certain embodiments of the invention.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some aspects, the playback device 110*a*, when bonded with the first playback device, is configured to render only the mid-range and high frequency components of a particular audio content, while the playback device 110*i* renders the low frequency component of the particular audio content. In some embodiments, the bonded playback device 110*q* includes additional playback devices and/or another bonded playback device. Additional playback device embodiments are described in further detail below with respect to FIGS. 2A-3D.

c. Suitable Network Microphone Devices (NMDs)

Figure 1F:
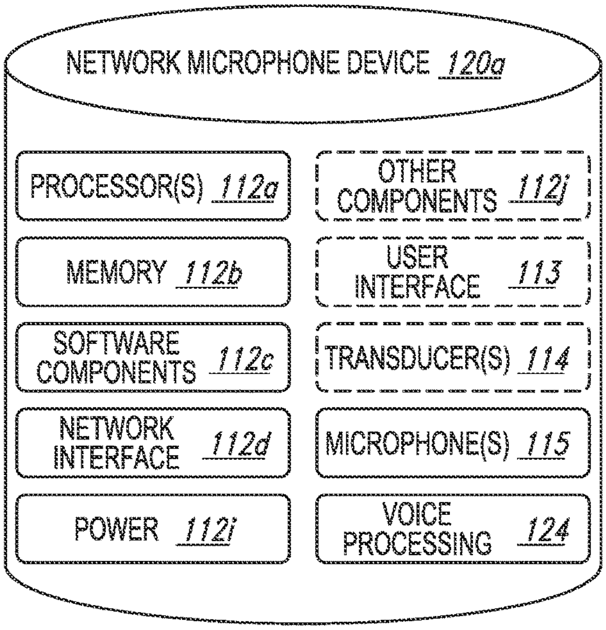
FIG. 1F is a block diagram of a network microphone device in accordance with certain embodiments of the invention.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio components 112*g* (FIG. 1C), the amplifiers 114, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing 124, and only a portion of the components of the electronics 112 described above with respect to FIG. 1B. In some aspects, for example, the NMD 120*a* includes the processor 112*a* and the memory 112*b* (FIG. 1B), while omitting one or more other components of the electronics 112. In some embodiments, the NMD 120*a* includes additional components (e.g., one or more sensors, cameras, thermometers, barometers, hygrometers).

Figure 1G:
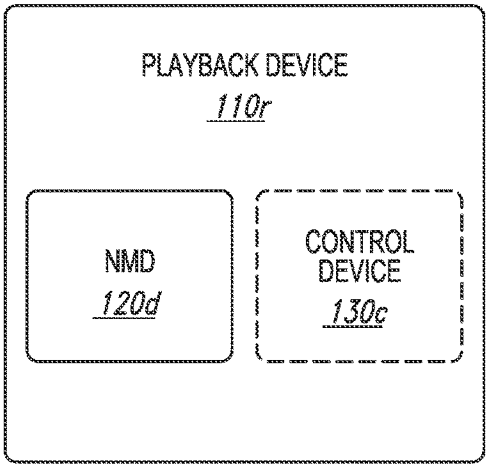
FIG. 1G is a block diagram of a playback device in accordance with certain embodiments of the invention.

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other embodiments, however, the playback device 110*r* receives commands from another control device (e.g., the control device 130*a* of FIG. 1B). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

Figure 1H:
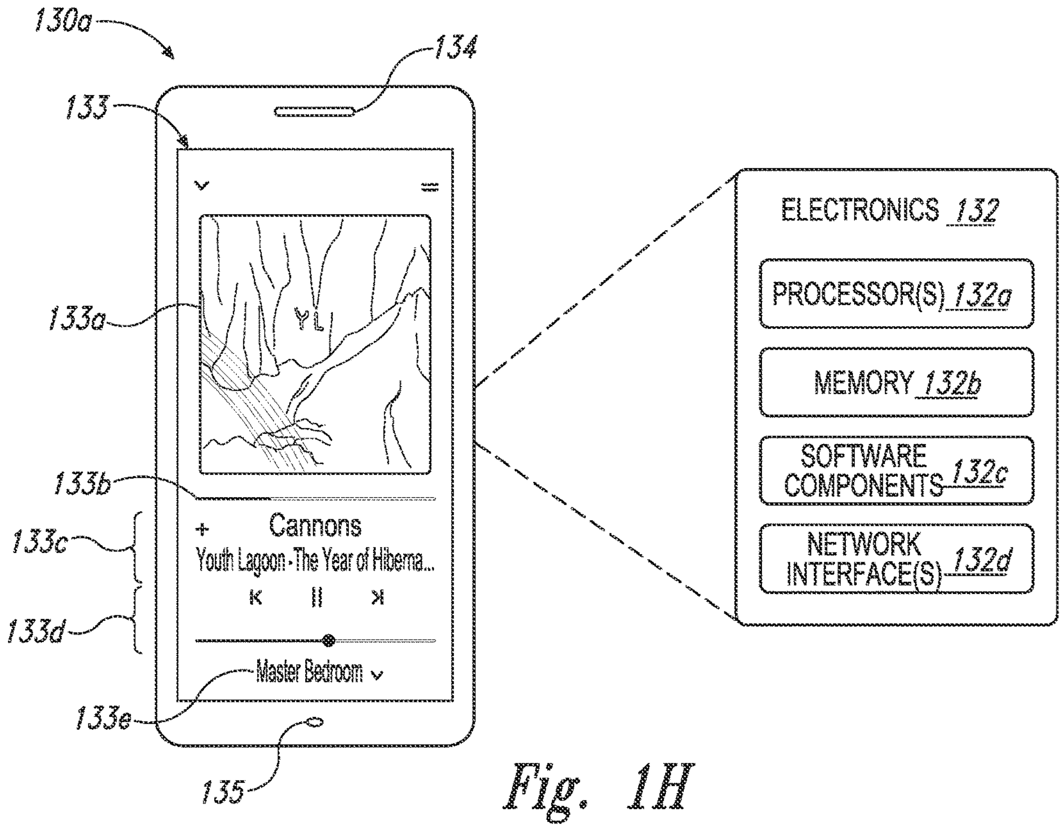
FIG. 1H is a partial schematic diagram of a control device in accordance with certain embodiments of the invention.
Figure 1I:
FIGS. 1-I through 1L are schematic diagrams of corresponding media playback system zones in accordance with certain embodiments of the invention.
FIG. 1M is a schematic diagram of media playback system areas in accordance with certain embodiments of the invention.

FIG. 1H is a partial schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated embodiment, the control device 130*a* comprises a smartphone (e.g., an iPhone™, an Android phone) on which media playback system controller application software is installed. In some embodiments, the control device 130*a* comprises, for example, a tablet (e.g., an iPad'), a computer (e.g., a laptop computer, a desktop computer), and/or another suitable device (e.g., a television, an automobile audio head unit, an IoT device). In certain embodiments, the control device 130*a* comprises a dedicated controller for the media playback system 100. In other embodiments, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 302 to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some embodiments, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 304 to one or more of the playback devices 100. The network interface 132*d* can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate control of the media playback system 100. The user interface 133 includes media content art 133*a* (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130*a* is configured to operate as playback device and an NMD. In other embodiments, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

Figure 1J:
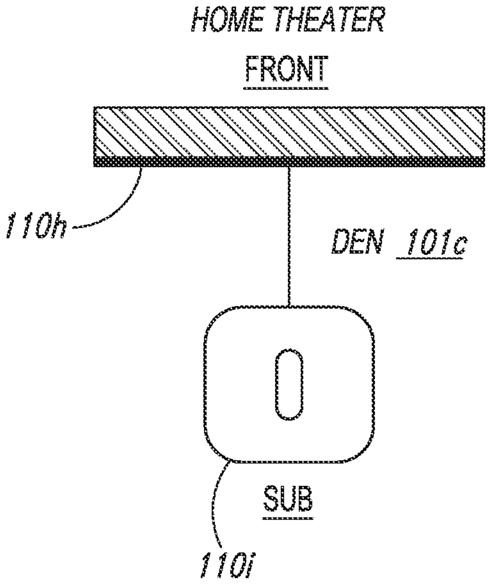
Figure 1K:
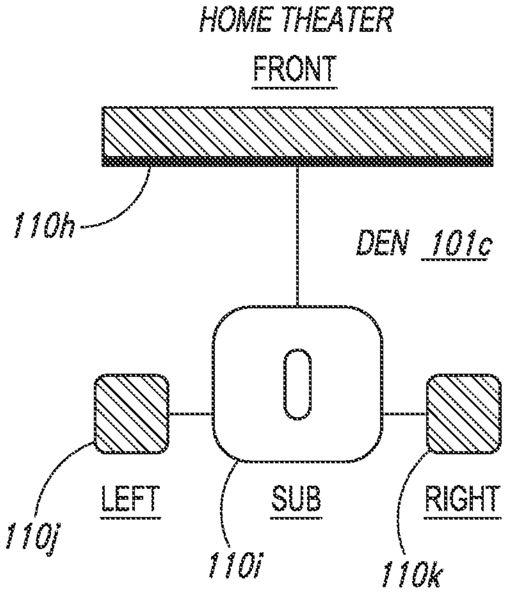
Figure 1L:
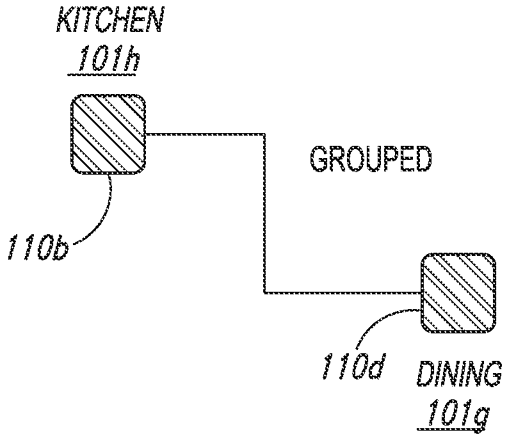
Figure 1M:
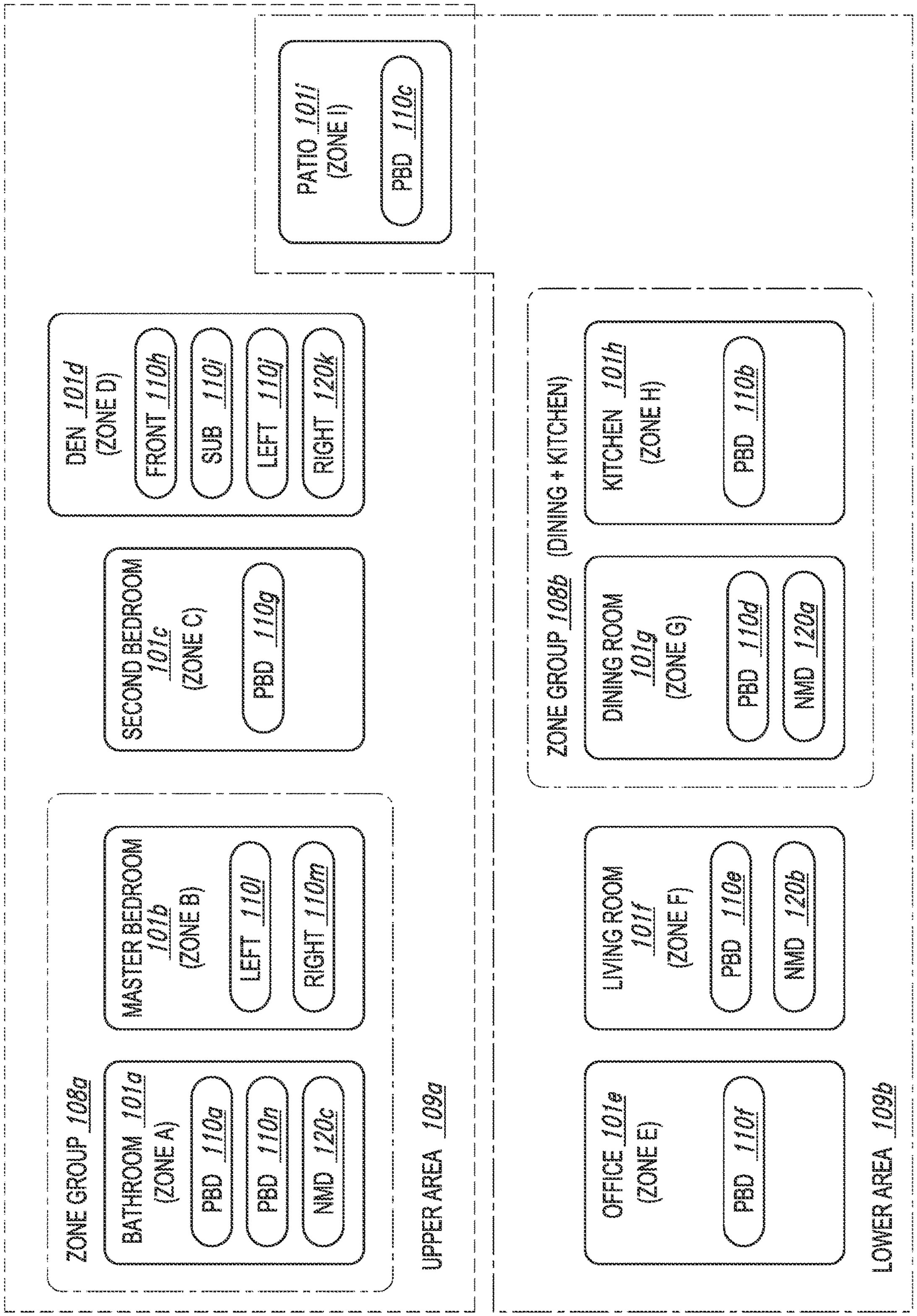

FIGS. 1-1 through 1M show example configurations of playback devices in zones and zone groups. Referring first to FIG. 1M, in one example, a single playback device may belong to a zone. For example, the playback device 110*g* in the second bedroom 101*c* (FIG. 1A) may belong to Zone C. In some implementations described below, multiple playback devices may be “bonded” to form a “bonded pair” which together form a single zone. For example, the playback device 110*l* (e.g., a left playback device) can be bonded to the playback device 110*l* (e.g., a left playback device) to form Zone A. Bonded playback devices may have different playback responsibilities (e.g., channel responsibilities). In another implementation described below, multiple playback devices may be merged to form a single zone. For example, the playback device 110*h* (e.g., a front playback device) may be merged with the playback device 110*i* (e.g., a subwoofer), and the playback devices 110*j* and 110*k* (e.g., left and right surround speakers, respectively) to form a single Zone D. In another example, the playback devices 110*g* and 110*h* can be merged to form a merged group or a zone group 108*b*. The merged playback devices 110*g* and 110*h* may not be specifically assigned different playback responsibilities. That is, the merged playback devices 110*h* and 110*i* may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110*l* and 110*m* may be bonded so as to produce or enhance a stereo effect of audio content. In this example, the playback device 110*l* may be configured to play a left channel audio component, while the playback device 110*k* may be configured to play a right channel audio component. In some implementations, such stereo bonding may be referred to as “pairing.”

Additionally, bonded playback devices may have additional and/or different respective speaker drivers. As shown in FIG. 1J, the playback device 110*h* named Front may be bonded with the playback device 110*i* named SUB. The Front device 110*h* can be configured to render a range of mid to high frequencies and the SUB device 110*i* can be configured render low frequencies. When unbonded, however, the Front device 110*h* can be configured render a full range of frequencies. As another example, FIG. 1K shows the Front and SUB devices 110*h* and 110*i* further bonded with Left and Right playback devices 110*j* and 110*k*, respectively. In some implementations, the Right and Left devices 110*j* and 102*k* can be configured to form surround or "satellite" channels of a home theater system. The bonded playback devices 110*h*, 110*i*, 110*j*, and 110*k* may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110*a* and 110*n* the master bathroom have the single UI entity of Zone A. In one embodiment, the playback devices 110*a* and 110*n* may each output the full range of audio content each respective playback devices 110*a* and 110*n* are capable of, in synchrony.

In some embodiments, an NMD is bonded or merged with another device so as to form a zone. For example, the NMD 120*b* may be bonded with the playback device 110*e*, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in U.S. Patent Publication No. 2017/0242653 titled "Voice Control of a Media Playback System," the relevant disclosure of which is hereby incorporated by reference herein in its entirety.

Zones of individual, bonded, and/or merged devices may be grouped to form a zone group. For example, referring to FIG. 1M, Zone A may be grouped with Zone B to form a zone group 108*a* that includes the two zones. Similarly, Zone G may be grouped with Zone H to form the zone group 108*b*. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108*b* can have be assigned a name such as "Dining+Kitchen", as shown in FIG. 1M. In some embodiments, a zone group may be given a unique name selected by a user.

Certain data may be stored in a memory of a playback device (e.g., the memory 112*c* of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101*c* may indicate that the playback device is the only playback device of the Zone C and not in a zone group. Identifiers associated with the Den may indicate that the Den is not grouped with other zones but includes bonded playback devices 110*h*-110*k*. Identifiers associated with the Dining Room may indicate that the Dining Room is part of the Dining+Kitchen zone group 108*b* and that devices 110*b* and 110*d* are grouped (FIG. 1L). Identifiers associated with the Kitchen may indicate the same or similar information by virtue of the Kitchen being part of the Dining+Kitchen zone group 108*b*. Other example zone variables and identifiers are described below.

In yet another example, the media playback system 100 may store variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109*a* including Zones A-D, and a Lower Area 109*b* including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. Patent Publication No. 2018/0107446 filed Aug. 21, 2017 and titled "Room Association Based on Name," and U.S. Pat. No. 8,483,853 filed Sep. 11, 2007, and titled "Controlling and manipulating groupings in a multi-zone media system." One playback device in a group can be identified as a group coordinator for the group, such as described in U.S. Patent Publication No. 2017/0192739 titled "Group Coordinator Selection." The relevant disclosure of each of these applications is incorporated herein by reference in its entirety. In some embodiments, the media playback system 100 may not implement Areas, in which case the system may not store variables associated with Areas.

III. Example Systems and Devices

Figure 2A:
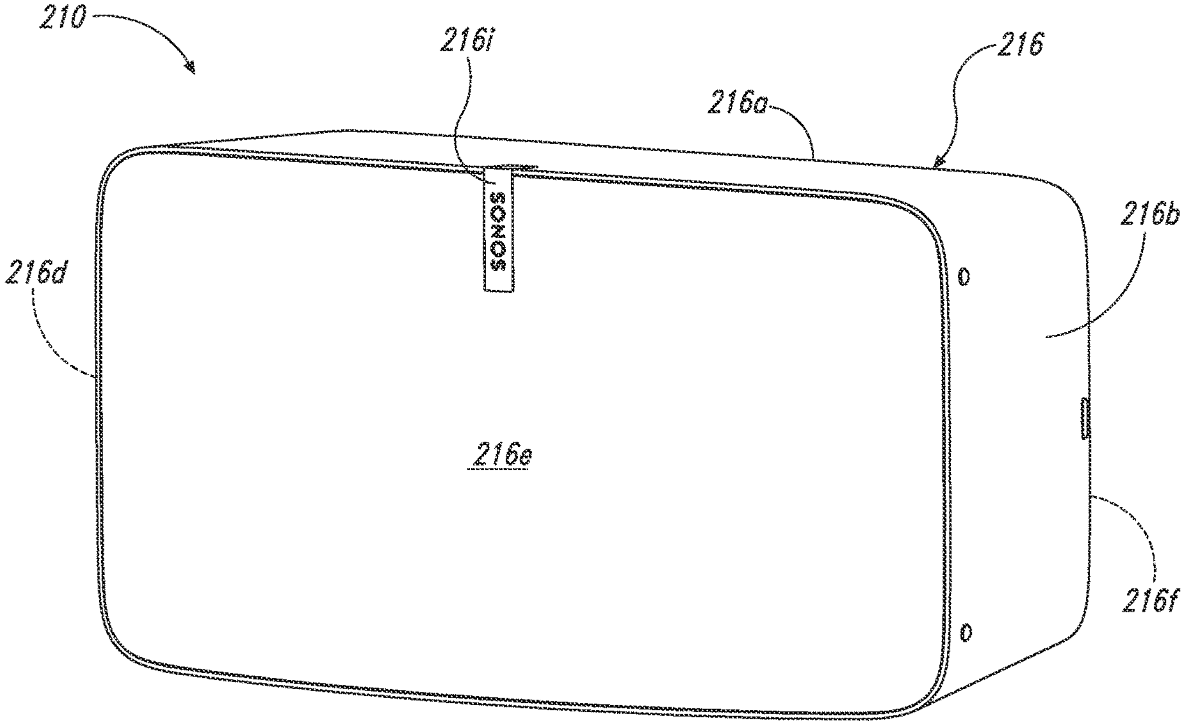
FIG. 2A is a front isometric view of a playback device configured in accordance with certain embodiments of the invention.
Figure 2B:
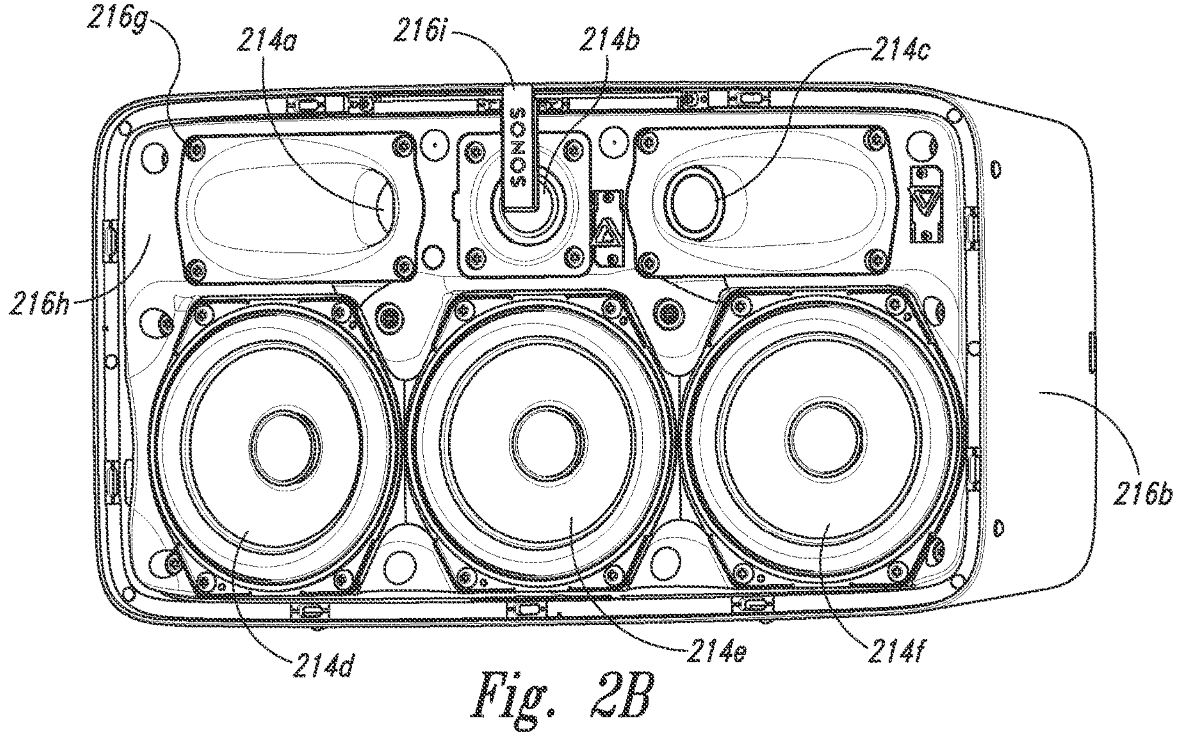
FIG. 2B is a front isometric view of the playback device of FIG. 3A without a grille.
Figure 2C:
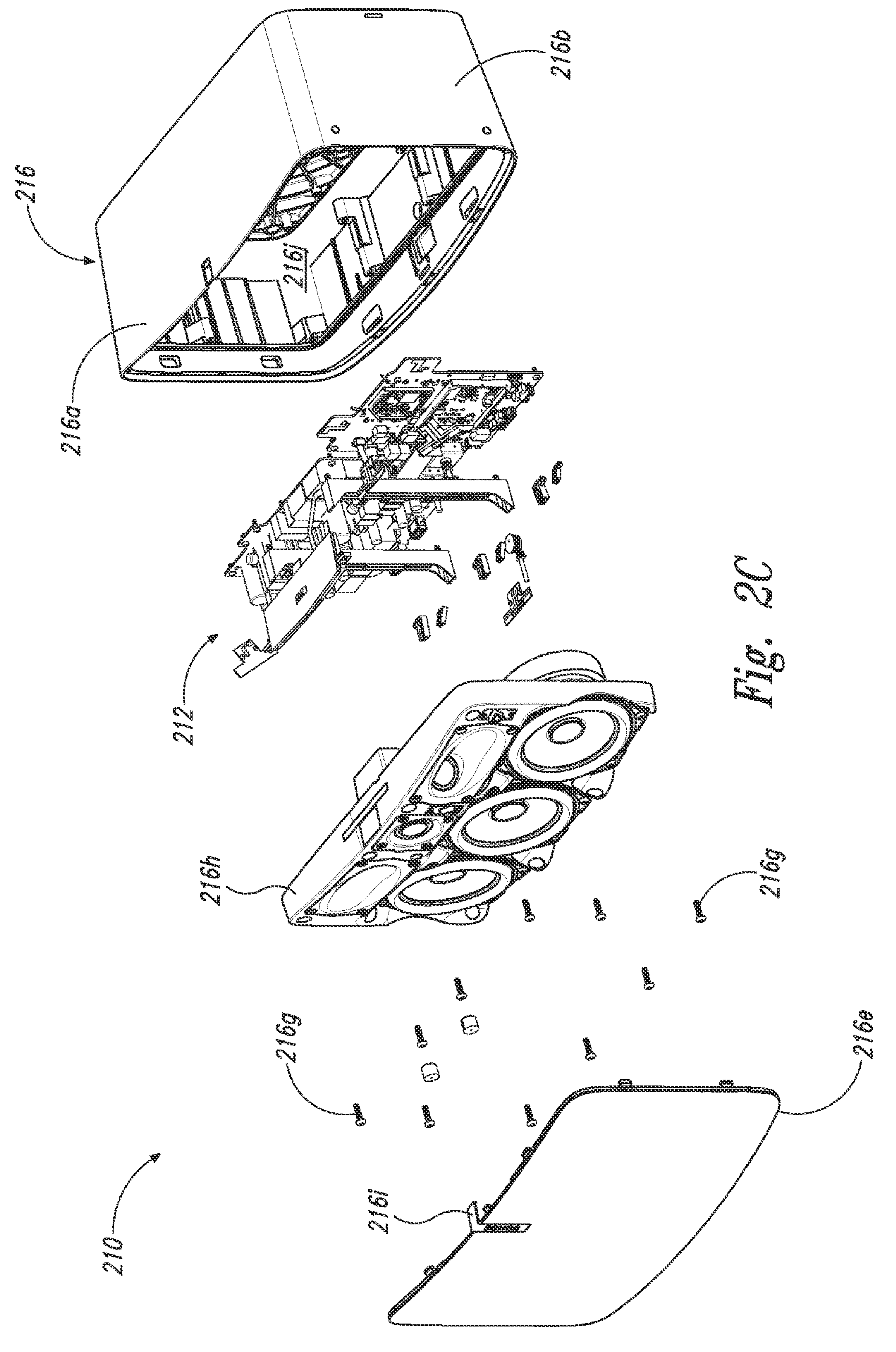
FIG. 2C is an exploded view of the playback device of FIG. 2A.

FIG. 2A is a front isometric view of a playback device 210 configured in accordance with aspects of the disclosed technology. FIG. 2B is a front isometric view of the playback device 210 without a grille 216*e*. FIG. 2C is an exploded view of the playback device 210. Referring to FIGS. 2A-2C together, the playback device 210 comprises a housing 216 that includes an upper portion 216*a*, a right or first side portion 216*b*, a lower portion 216*c*, a left or second side portion 216*d*, the grille 216*e*, and a rear portion 216*f*. A plurality of fasteners 216*g* (e.g., one or more screws, rivets, clips) attaches a frame 216*h* to the housing 216. A cavity 216*j* (FIG. 2C) in the housing 216 is configured to receive the frame 216*h* and electronics 212. The frame 216*h* is configured to carry a plurality of transducers 214 (identified individually in FIG. 2B as transducers 214*a-f*). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214*a-c* (e.g., tweeters) can be configured to output high frequency sound (e.g., sound waves having a frequency greater than about 2 kHz). The transducers 214*d-f* (e.g., mid-woofers, woofers, midrange speakers) can be configured output sound at frequencies lower than the transducers 214*a-c* (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216*i* is axially aligned with the transducer 214*b*. The filter 216*i* can be configured to desirably attenuate a predetermined range of frequencies that the transducer 214*b* outputs to improve sound quality and a perceived sound stage output collectively by the transducers 214. In some embodiments, however, the playback device 210 omits the filter 216*i*. In other embodiments, the playback device 210 includes one or more additional filters aligned with the transducers 214*b* and/or at least another of the transducers 214.

Figure 3A:
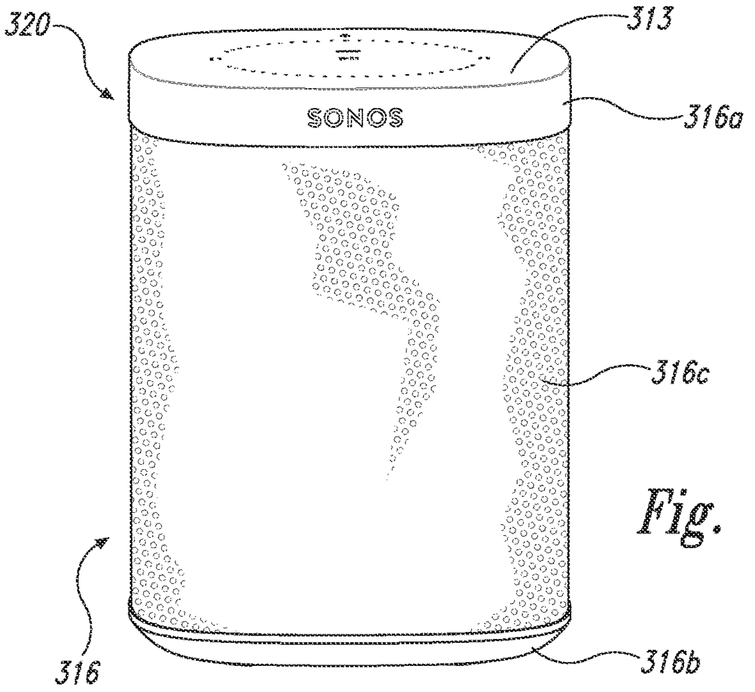
FIG. 3A is a front view of a network microphone device configured in accordance with certain embodiments of the invention.
Figure 3B:
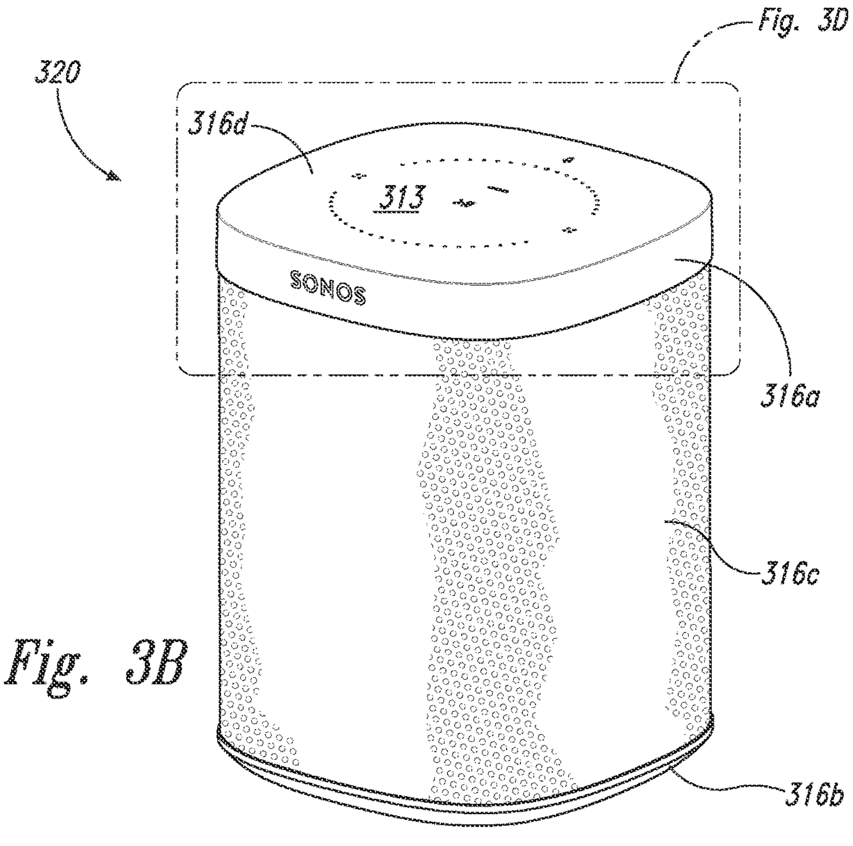
FIG. 3B is a side isometric view of the network microphone device of FIG. 3A.
Figure 3C:
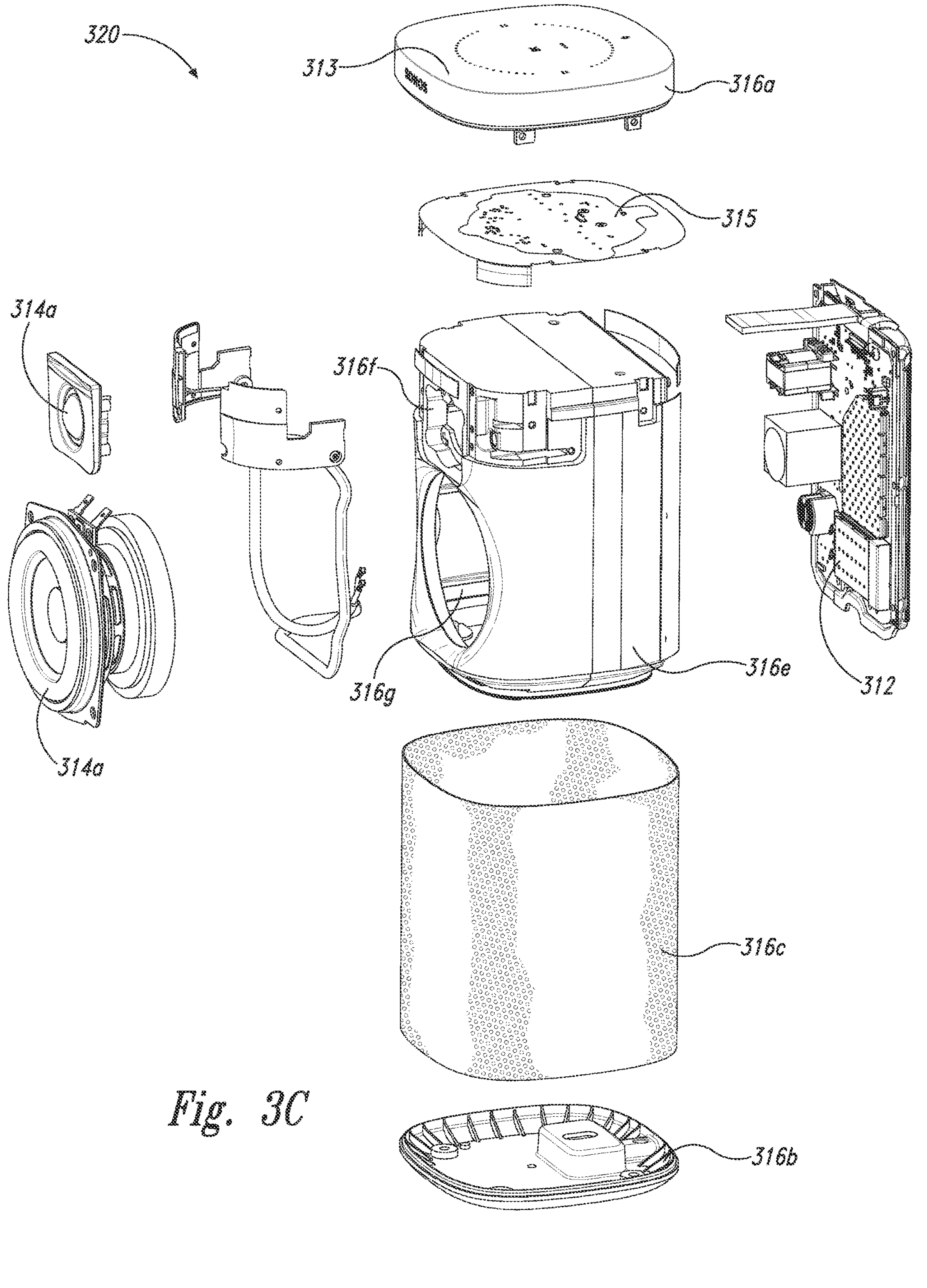
FIG. 3C is an exploded view of the network microphone device of FIGS. 3A and 3B.
Figure 3D:
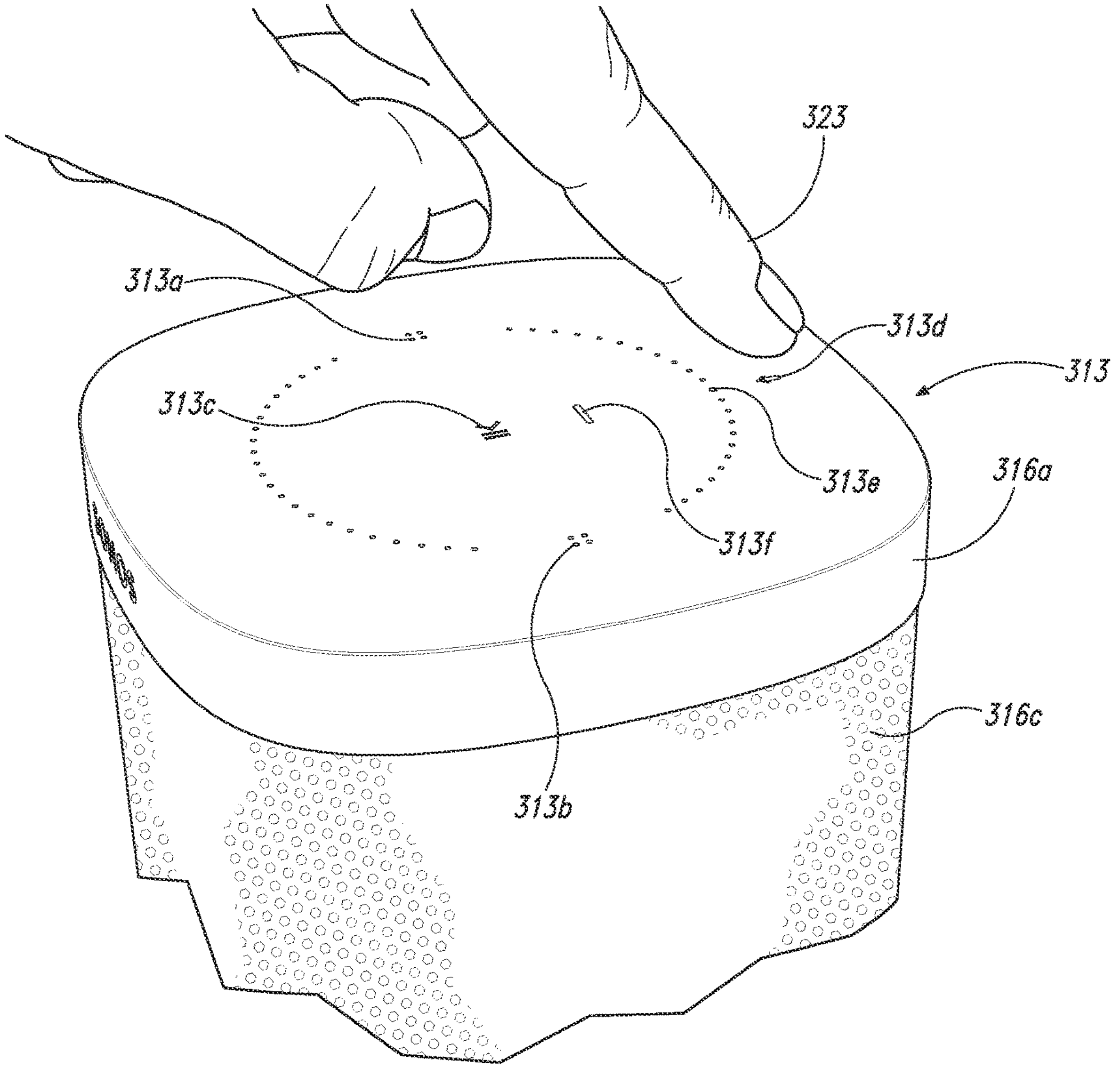
FIG. 3D is an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316*a*, a lower portion 316*b* and an intermediate portion 316*c* (e.g., a grille). A plurality of ports, holes or apertures 316*d* in the upper portion 316*a* allow sound to pass through to one or more microphones 315 (FIG. 3C) positioned within the housing 316. The one or more microphones 316 are configured to received sound via the apertures 316*d* and produce electrical signals based on the received sound. In the illustrated embodiment, a frame 316*e* (FIG. 3C) of the housing 316 surrounds cavities 316*f* and 316*g* configured to house, respectively, a first transducer 314*a* (e.g., a tweeter) and a second transducer 314*b* (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314*a* and 314*b* altogether.

Electronics 312 (FIG. 3C) includes components configured to drive the transducers 314*a* and 314*b*, and further configured to analyze audio data corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112*a*, the memory 112*b*, the software components 112*c*, the network interface 112*d*, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313*a* (e.g., a previous control), a second control surface 313*b* (e.g., a next control), and a third control surface 313*c* (e.g., a play and/or pause control). A fourth control surface 313*d* is configured to receive touch input corresponding to activation and deactivation of the one or microphones 315. A first indicator 313*e* (e.g., one or more light emitting diodes (LEDs) or another suitable illuminator) can be configured to illuminate only when the one or more microphones 315 are activated. A second indicator 313*f* (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313*e*, omitting the second indicator 313*f*. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figure 3E:
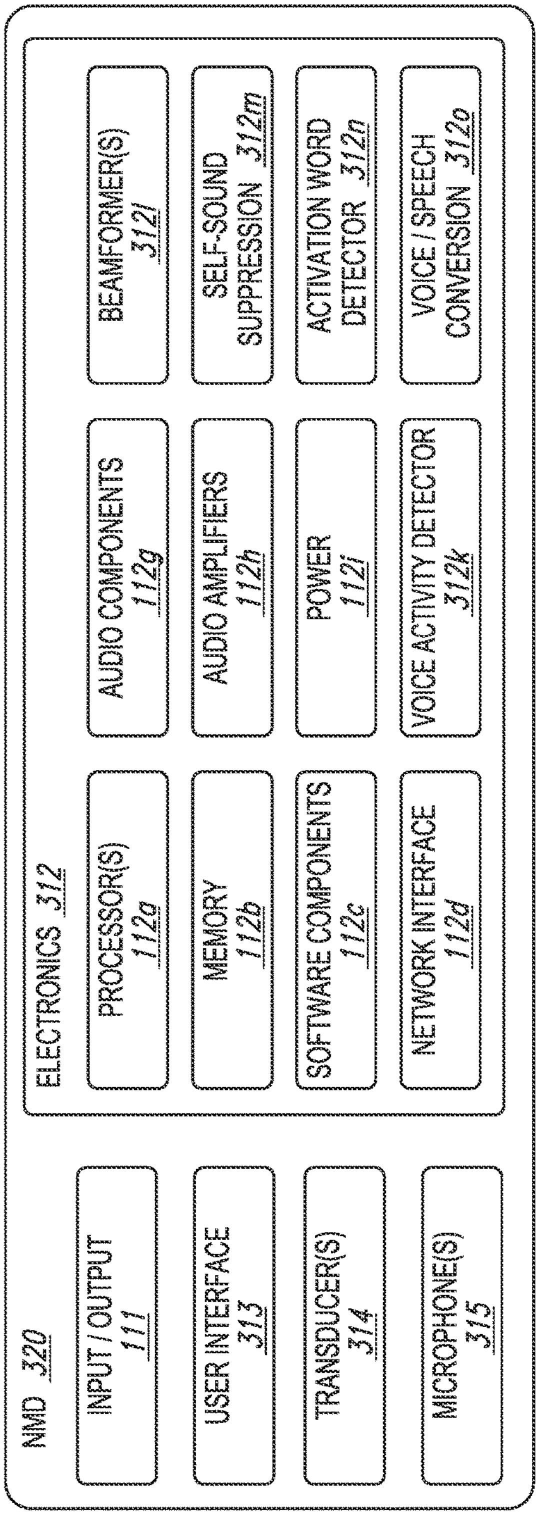
FIG. 3E is a block diagram of the network microphone device of FIGS. 3A-3D in accordance with certain embodiments of the invention.

FIG. 3E is a functional block diagram showing additional features of the NMD 320 in accordance with aspects of the disclosure. The NMD 320 includes components configured to facilitate voice command capture including voice activity detector component(s) 312*k*, beam former components 312*l*, acoustic echo cancellation (AEC) and/or self-sound suppression components 312*m*, activation word detector components 312*n*, and voice/speech conversion components 312*o* (e.g., voice-to-text and text-to-voice). In the illustrated embodiment of FIG. 3E, the foregoing components 312*k*-312*o* are shown as separate components. In some embodiments, however, one or more of the components 312*k*-312*o* are subcomponents of the processors 112*a*.

The beamforming and self-sound suppression components 312*l* and 312*m* are configured to detect an audio signal and determine aspects of voice input represented in the detected audio signal, such as the direction, amplitude, frequency spectrum, etc. The voice activity detector activity components 312*k* are operably coupled with the beamforming and AEC components 312*l* and 312*m* and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise. The activation word detector components 312*n* are configured to monitor and analyze received audio to determine if any activation words (e.g., wake words) are present in the received audio. The activation word detector components 312*n* may analyze the received audio using an activation word detection algorithm. If the activation word detector 312*n* detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312*n* runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312*n* may run the received audio through the activation word detection algorithm for each supported voice service in parallel.

The speech/text conversion components 312*o* may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

Figure 3F:
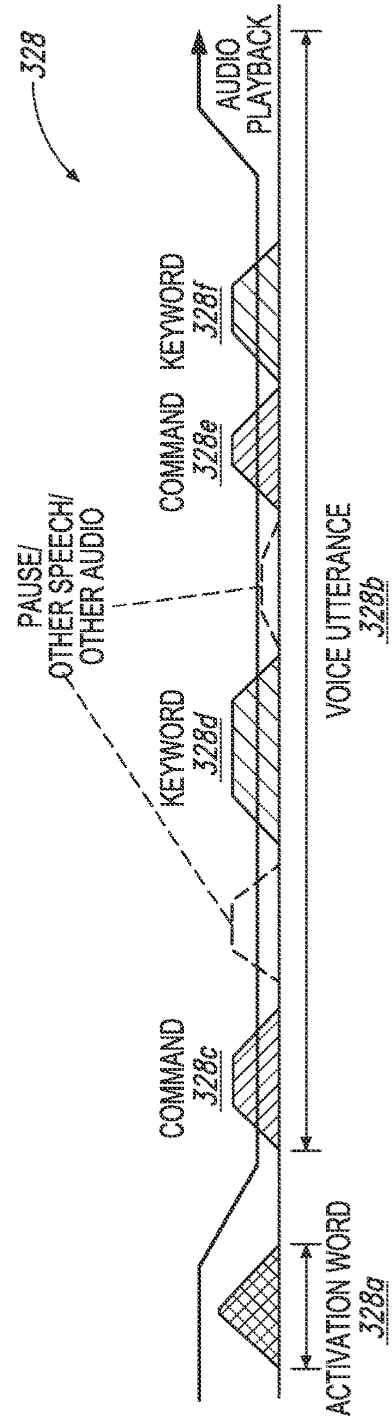
FIG. 3F is a schematic diagram of an example voice input.

FIG. 3F is a schematic diagram of an example voice input 328 captured by the NMD 320 in accordance with aspects of the disclosure. The voice input 328 can include a activation word portion 328*a* and a voice utterance portion 328*b*. In some embodiments, the activation word 557*a* can be a known activation word, such as "Alexa," which is associated with AMAZON's ALEXA®. In other embodiments, however, the voice input 328 may not include an activation word. In some embodiments, a network microphone device may output an audible and/or visible response upon detection of the activation word portion 328*a*. In addition or alternately, an NMB may output an audible and/or visible response after processing a voice input and/or a series of voice inputs.

The voice utterance portion 328*b* may include, for example, one or more spoken commands (identified individually as a first command 328*c* and a second command 328*e*) and one or more spoken keywords (identified individually as a first keyword 328*d* and a second keyword 3280. In one example, the first command 328*c* can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328*b* can include other information, such as detected pauses (e.g., periods of non-speech) between words spoken by a user, as shown in FIG. 3F. The pauses may demarcate the locations of separate commands, keywords, or other information spoke by the user within the voice utterance portion 328*b*.

In some embodiments, the media playback system 100 is configured to temporarily reduce the volume of audio content that it is playing while detecting the activation word portion 557*a*. The media playback system 100 may restore the volume after processing the voice input 328, as shown in FIG. 3F. Such a process can be referred to as ducking, examples of which are disclosed in U.S. Patent Publication No. 2017/0242653 titled "Voice Control of a Media Playback System," the relevant disclosure of which is hereby incorporated by reference herein in its entirety.

Figure 4A:
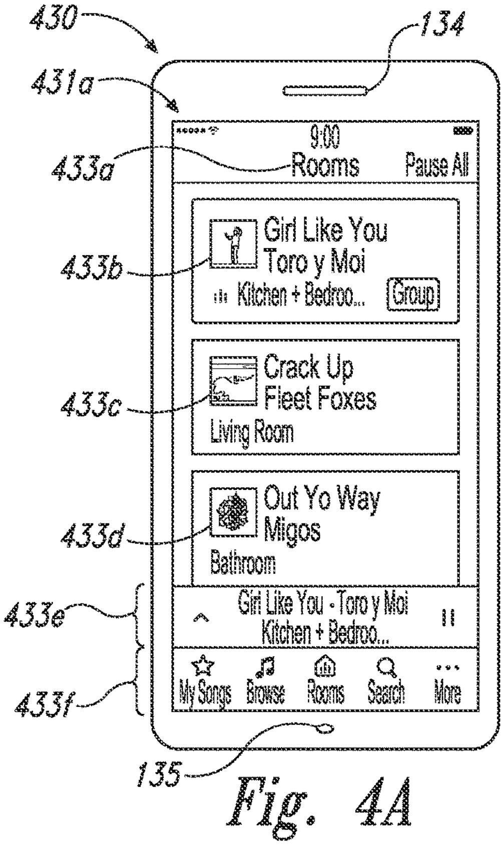
FIGS. 4A-4D are schematic diagrams of a control device in various stages of operation in accordance with certain embodiments of the invention.
Figure 4B:
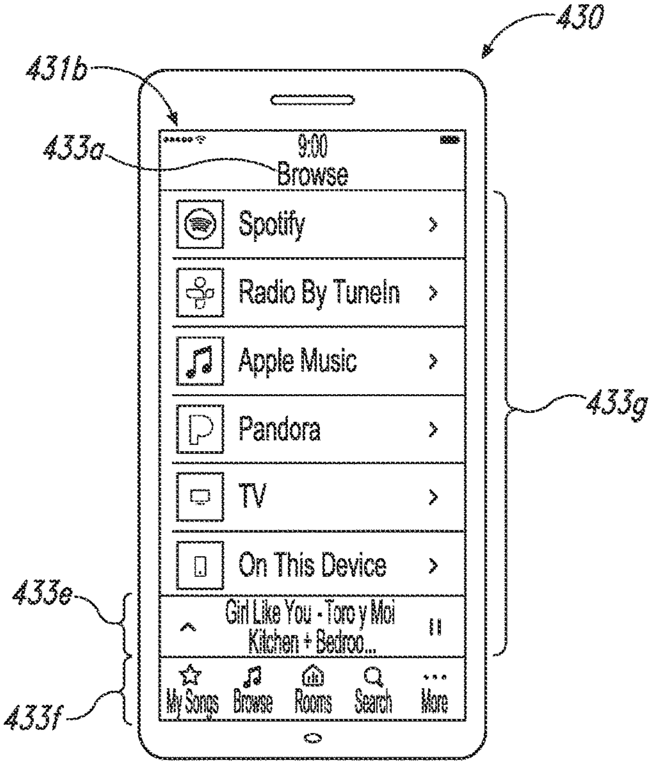
Figure 4C:
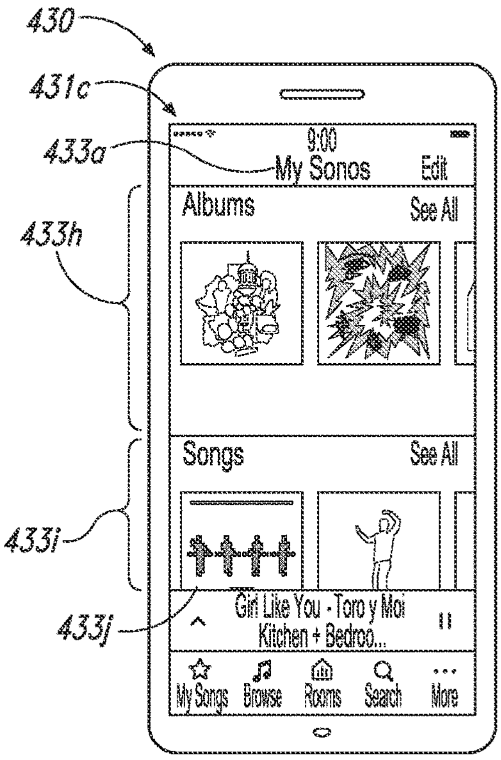
Figure 4D:
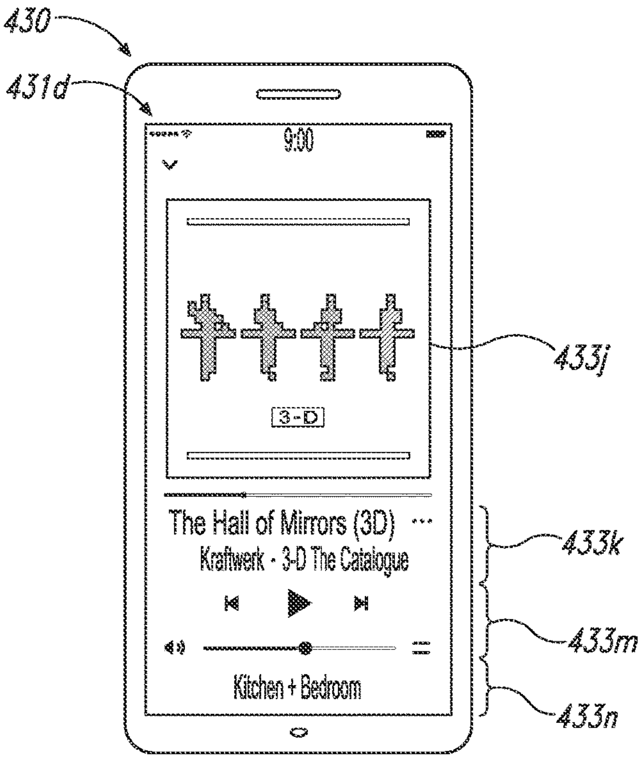

FIGS. 4A-4D are schematic diagrams of a control device 430 (e.g., the control device 130*a* of FIG. 1H, a smartphone, a tablet, a dedicated control device, an IoT device, and/or another suitable device) showing corresponding user interface displays in various states of operation. A first user interface display 431*a* (FIG. 4A) includes a display name 433*a* (i.e., "Rooms"). A selected group region 433*b* displays audio content information (e.g., artist name, track name, album art) of audio content played back in the selected group and/or zone. Group regions 433*c* and 433*d* display corresponding group and/or zone name, and audio content information audio content played back or next in a playback queue of the respective group or zone. An audio content region 433*e* includes information related to audio content in the selected group and/or zone (i.e., the group and/or zone indicated in the selected group region 433*b*). A lower display region 433*f* is configured to receive touch input to display one or more other user interface displays. For example, if a user selects "Browse" in the lower display region 433*f*, the control device 430 can be configured to output a second user interface display 431*b* (FIG. 4B) comprising a plurality of music services 433*g* (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433*f*, the control device 430 can be configured to output a third user interface display 431*c* (FIG. 4C). A first media content region 433*h* can include graphical representations (e.g., album art) corresponding to individual albums, stations, or playlists. A second media content region 433*i* can include graphical representations (e.g., album art) corresponding to individual songs, tracks, or other media content. If the user selections a graphical representation 433*j* (FIG. 4C), the control device 430 can be configured to begin play back of audio content corresponding to the graphical representation 433*j* and output a fourth user interface display 431*d* fourth user interface display 431*d* includes an enlarged version of the graphical representation 433*j*, media content information 433*k* (e.g., track name, artist, album), transport controls 433*m* (e.g., play, previous, next, pause, volume), and indication 433*n* of the currently selected group and/or zone name.

Figure 5:
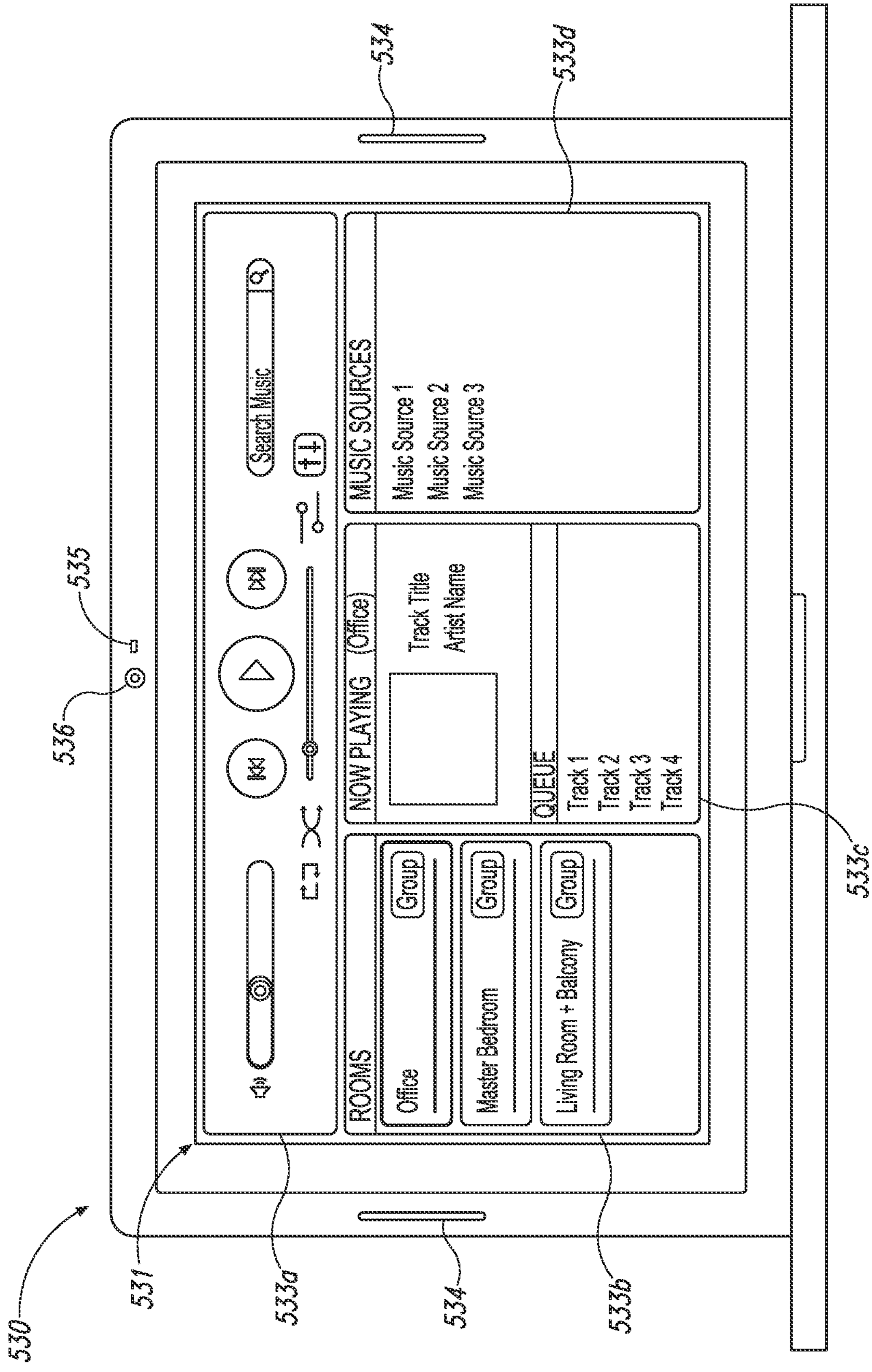
FIG. 5 is front view of a control device in accordance with certain embodiments of the invention.

FIG. 5 is a schematic diagram of a control device 530 (e.g., a laptop computer, a desktop computer). The control device 530 includes transducers 534, a microphone 535, and a camera 536. A user interface 531 includes a transport control region 533*a*, a playback status region 533*b*, a playback zone region 533*c*, a playback queue region 533*d*, and a media content source region 533*e*. The transport control region comprises one or more controls for controlling media playback including, for example, volume, previous, play/pause, next, repeat, shuffle, track position, crossfade, equalization, etc. The audio content source region 533*e* includes a listing of one or more media content sources from which a user can select media items for play back and/or adding to a playback queue.

The playback zone region 533*b* can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533*b* can be dynamically updated as playback zone or zone group configurations are modified.

The playback status region 533*c* includes graphical representations of audio content that is presently being played, previously played, or scheduled to play next in the selected playback zone or zone group. The selected playback zone or zone group may be visually distinguished on the user interface, such as within the playback zone region 533*b* and/or the playback queue region 533*d*. The graphical representations may include track title, artist name, album name, album year, track length, and other relevant information that may be useful for the user to know when controlling the media playback system 100 via the user interface 531.

The playback queue region 533*d* includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
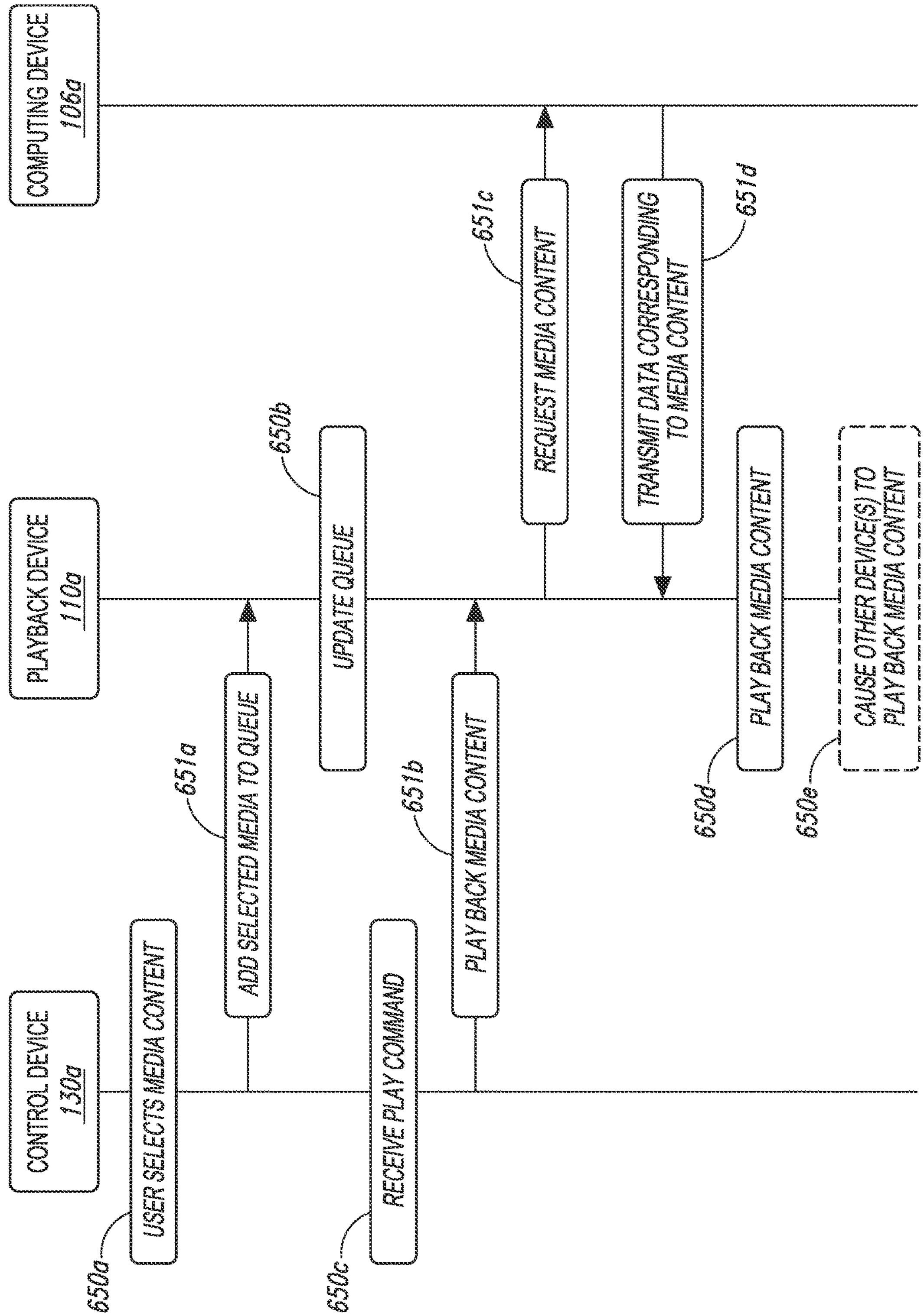
FIG. 6 is a message flow diagram of a media playback system in accordance with certain embodiments of the invention.
Figure 7A:
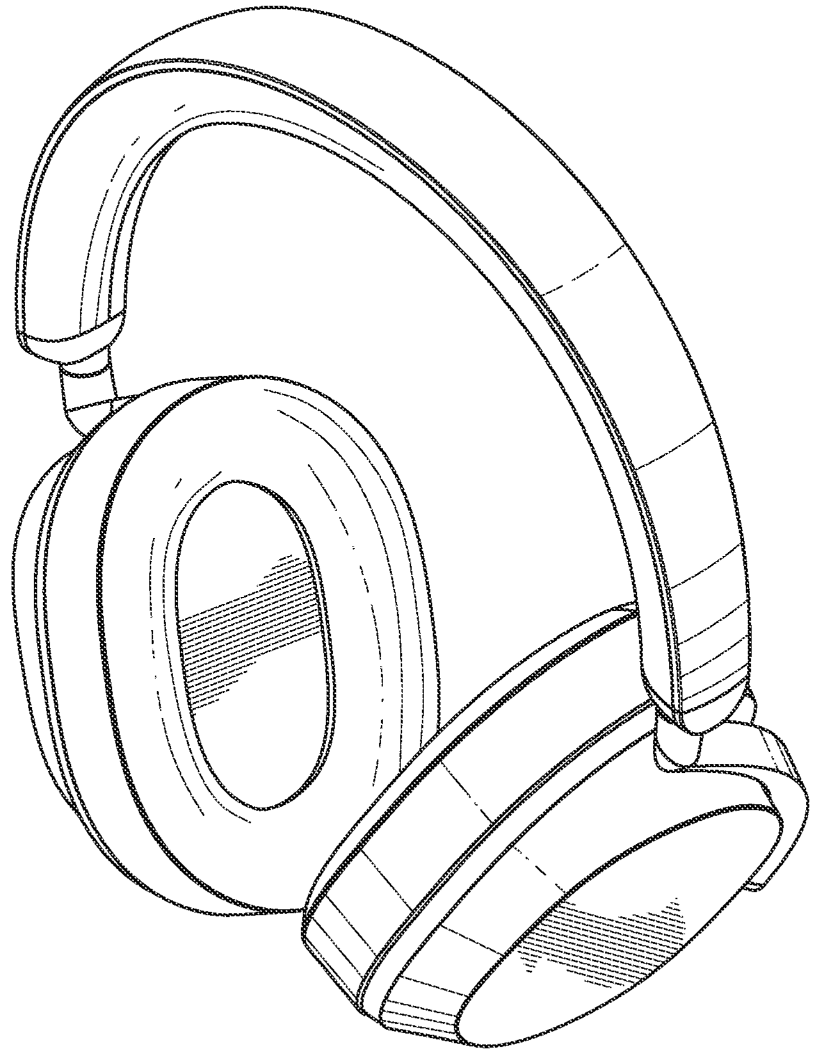
FIGS. 7A-D illustrates a headphone design in accordance with certain embodiments of the invention.
Figure 7B:
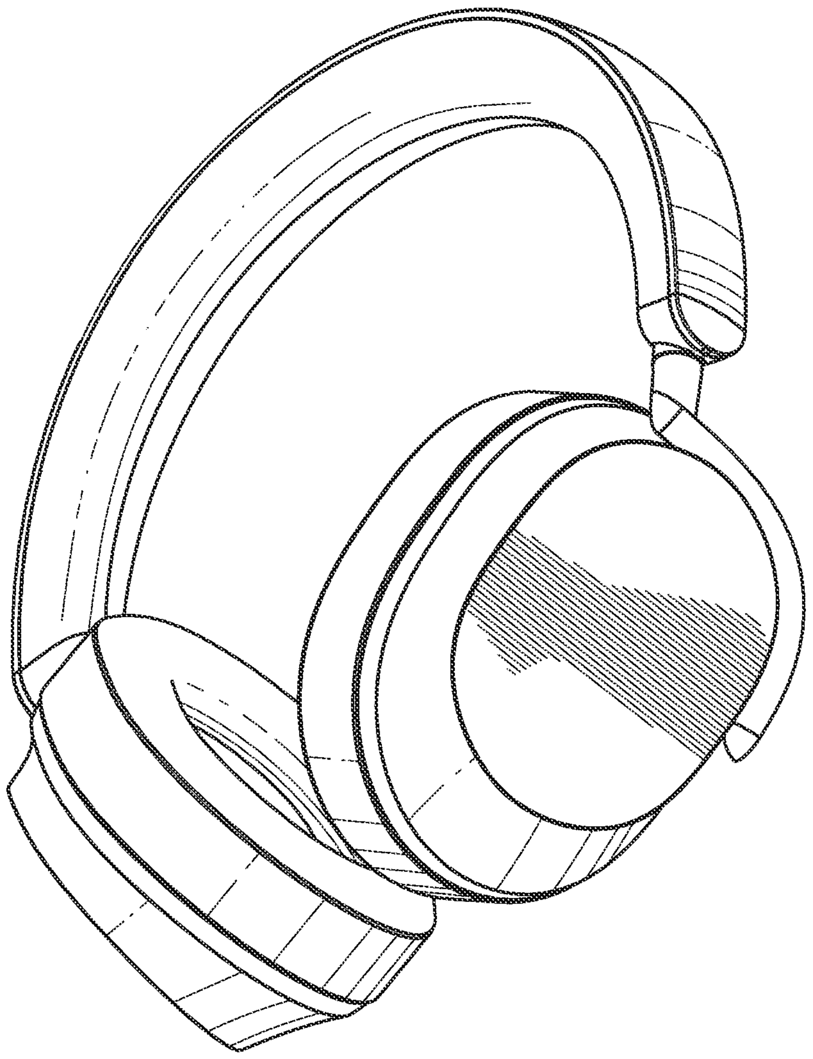
Figure 7C:
Figure 7D:
Figure 8A:
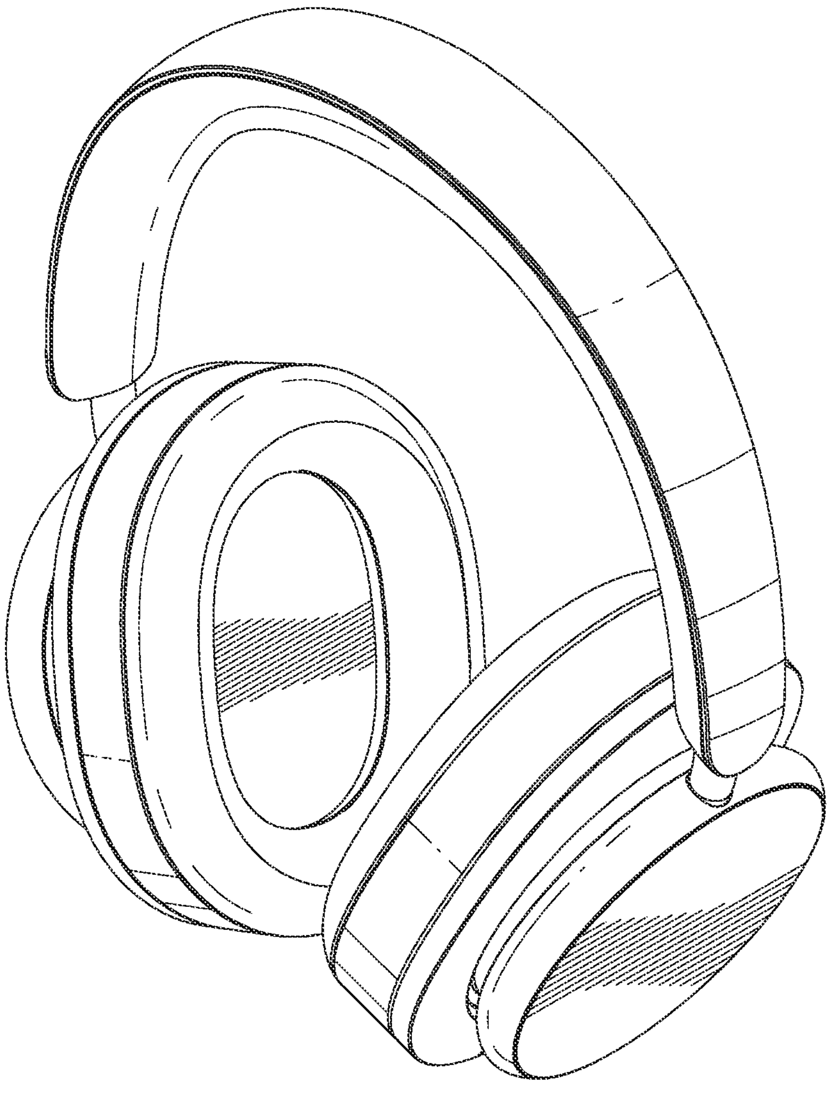
FIGS. 8A-H illustrate a headphone design in accordance with certain embodiments of the invention.
Figure 8B:
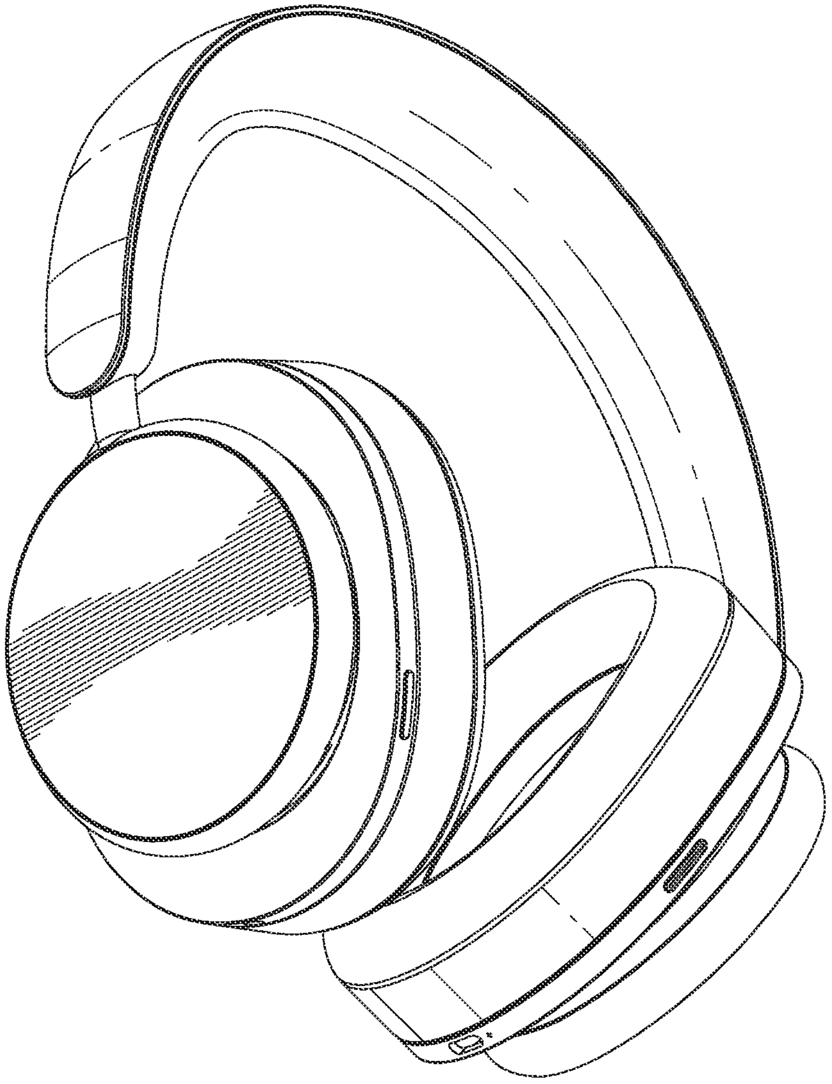
Figure 8C:
Figure 8D:
Figure 8E:
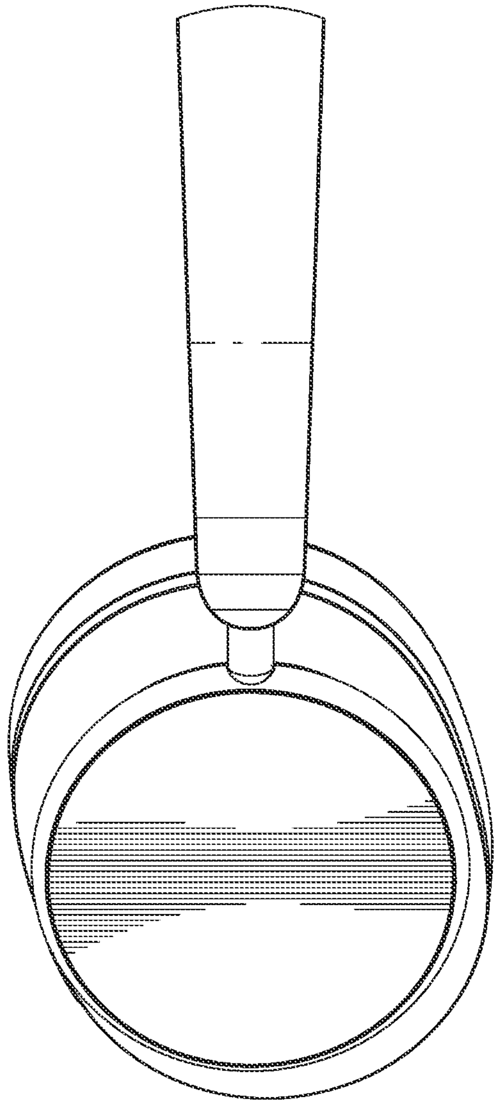
Figure 8F:
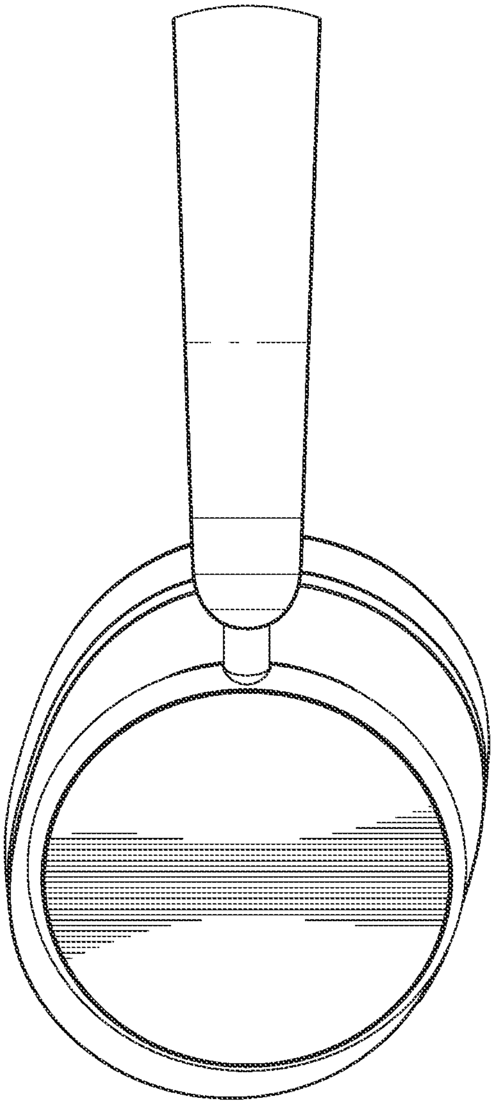
Figure 8G:
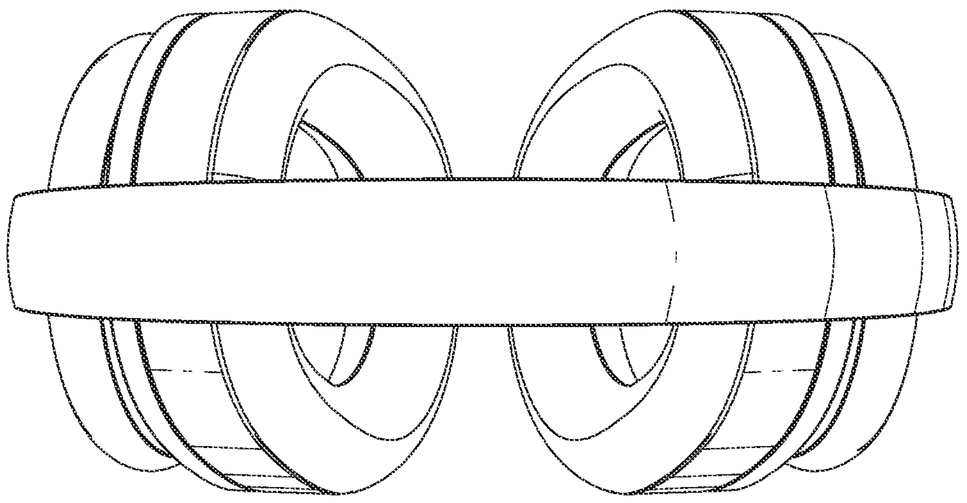
Figure 8H:
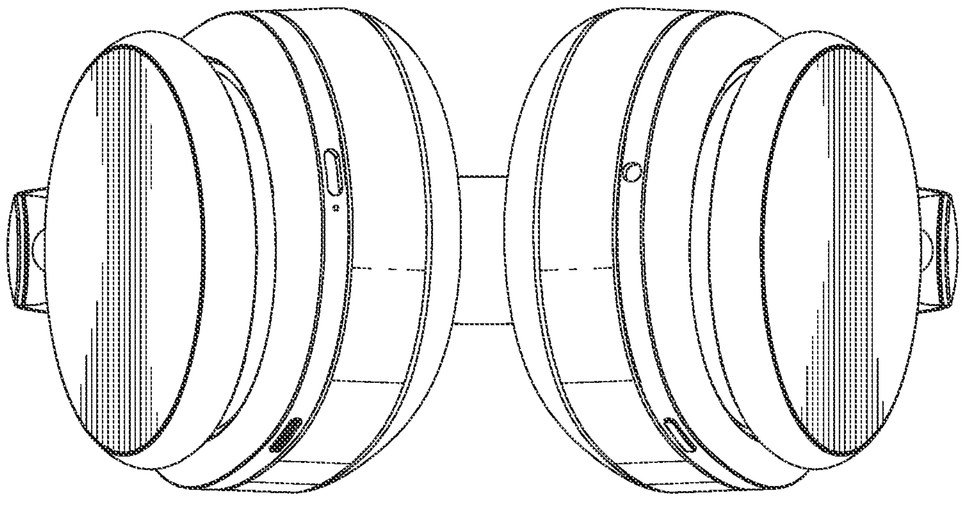
Figure 9A:
FIGS. 9A-H illustrate a headphone design in accordance with certain embodiments of the invention.
Figure 9B:
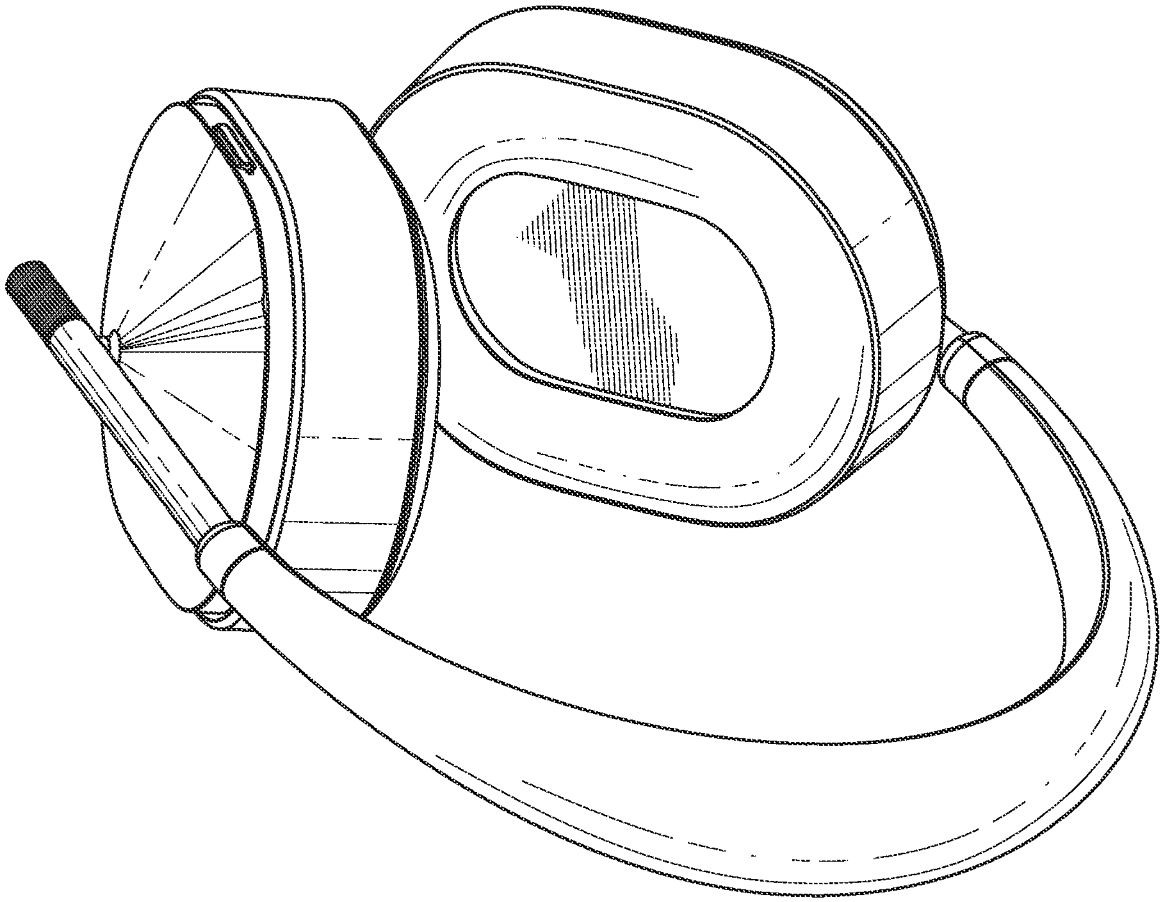
Figure 9C:
Figure 9D:
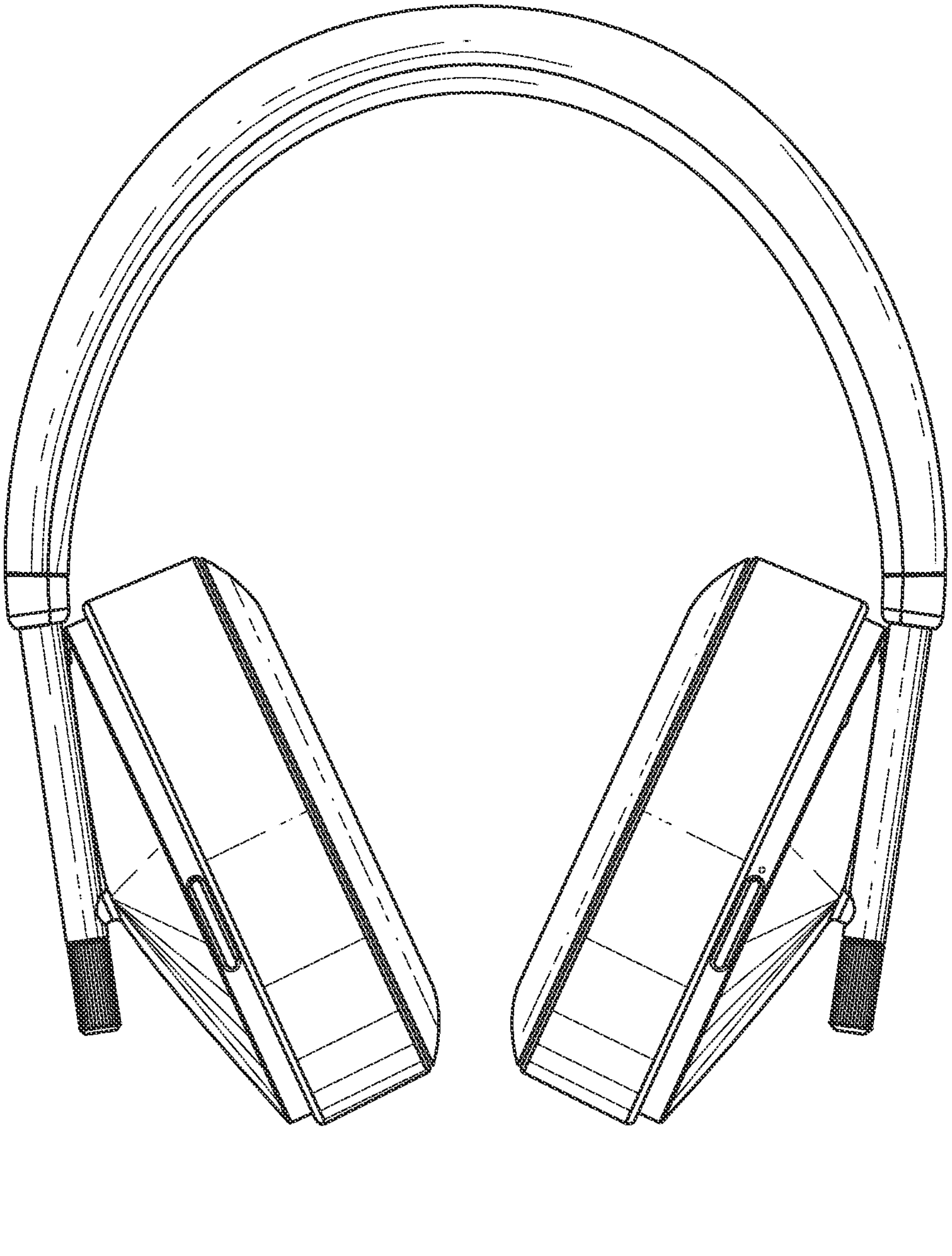
Figure 9E:
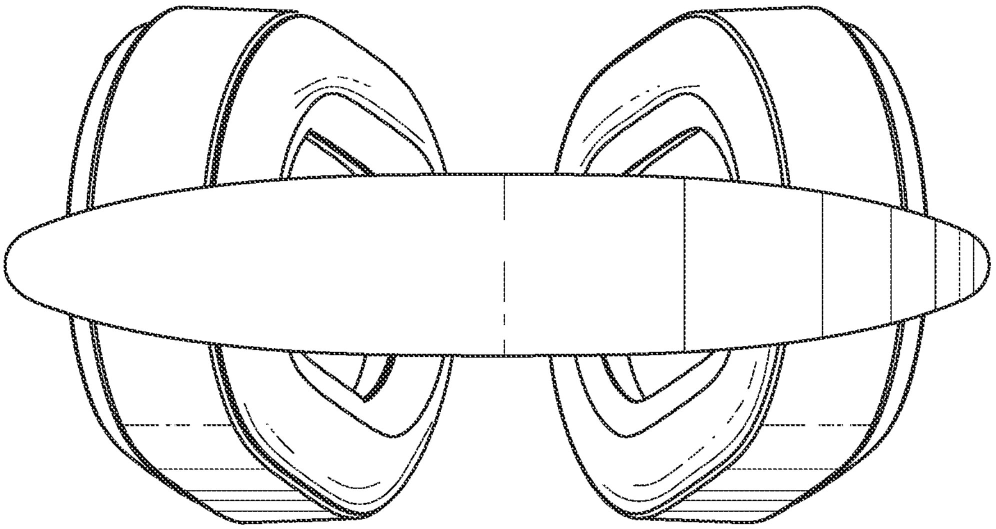
Figure 9F:
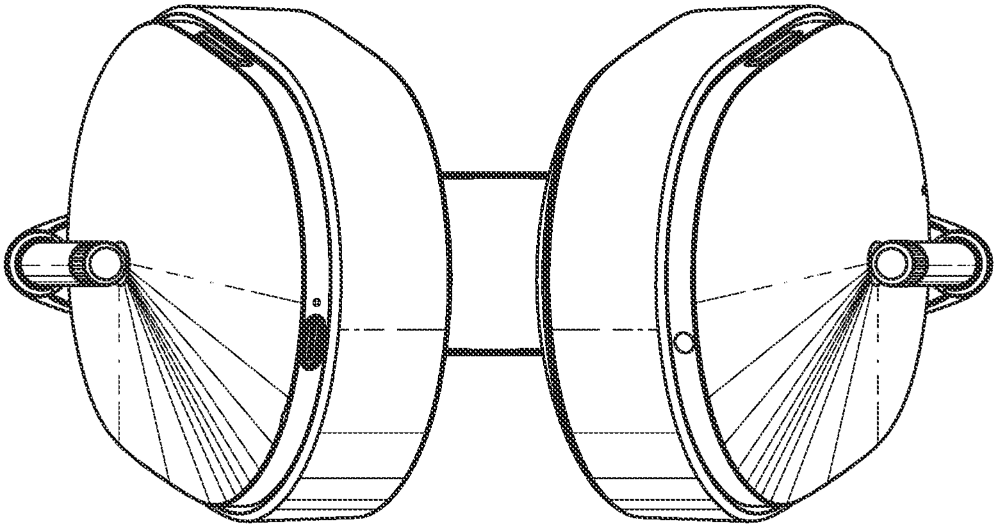
Figure 9G:
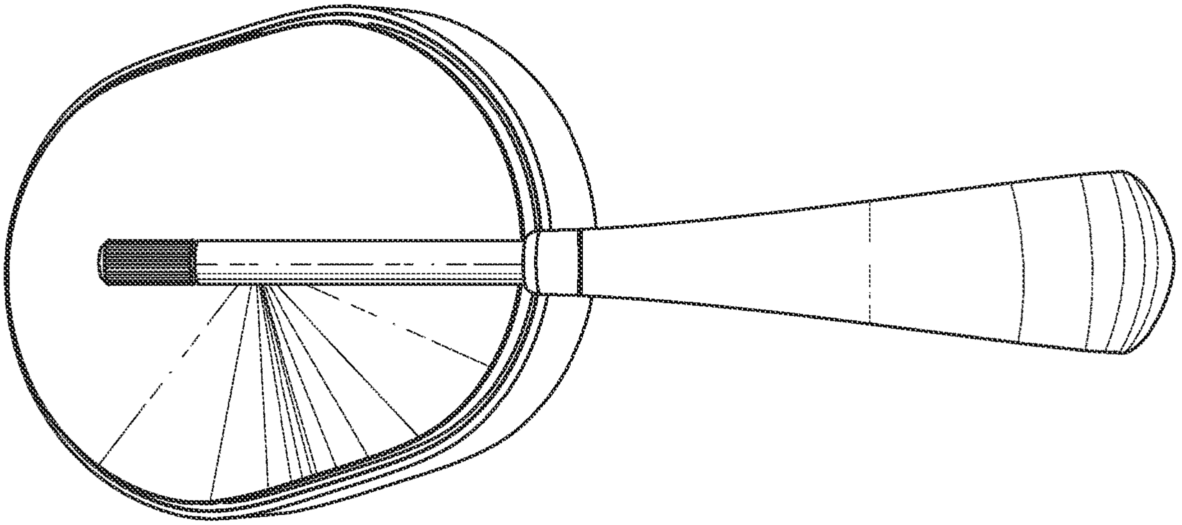
Figure 9H:
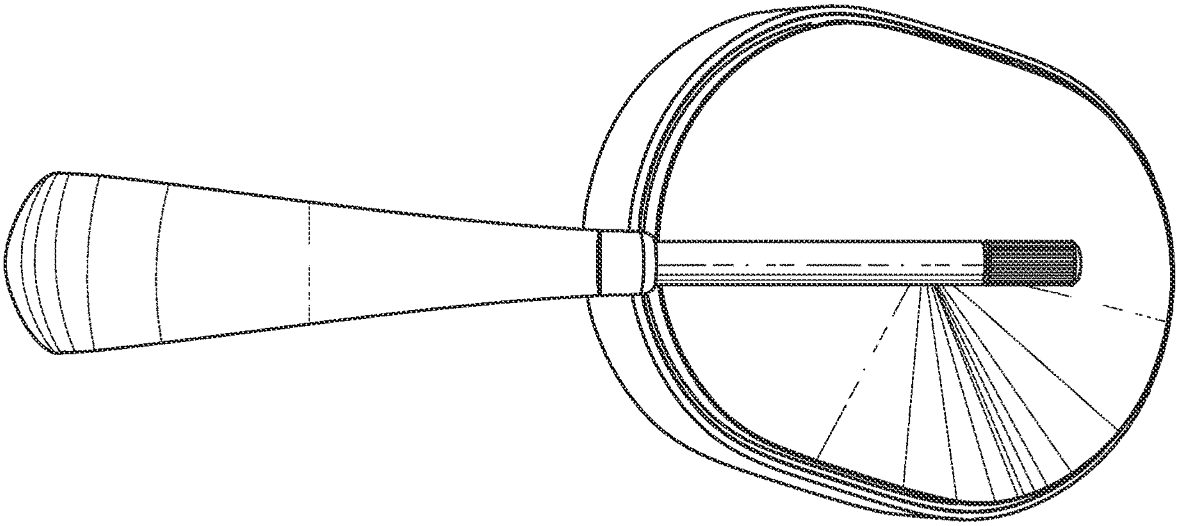
Figure 10:
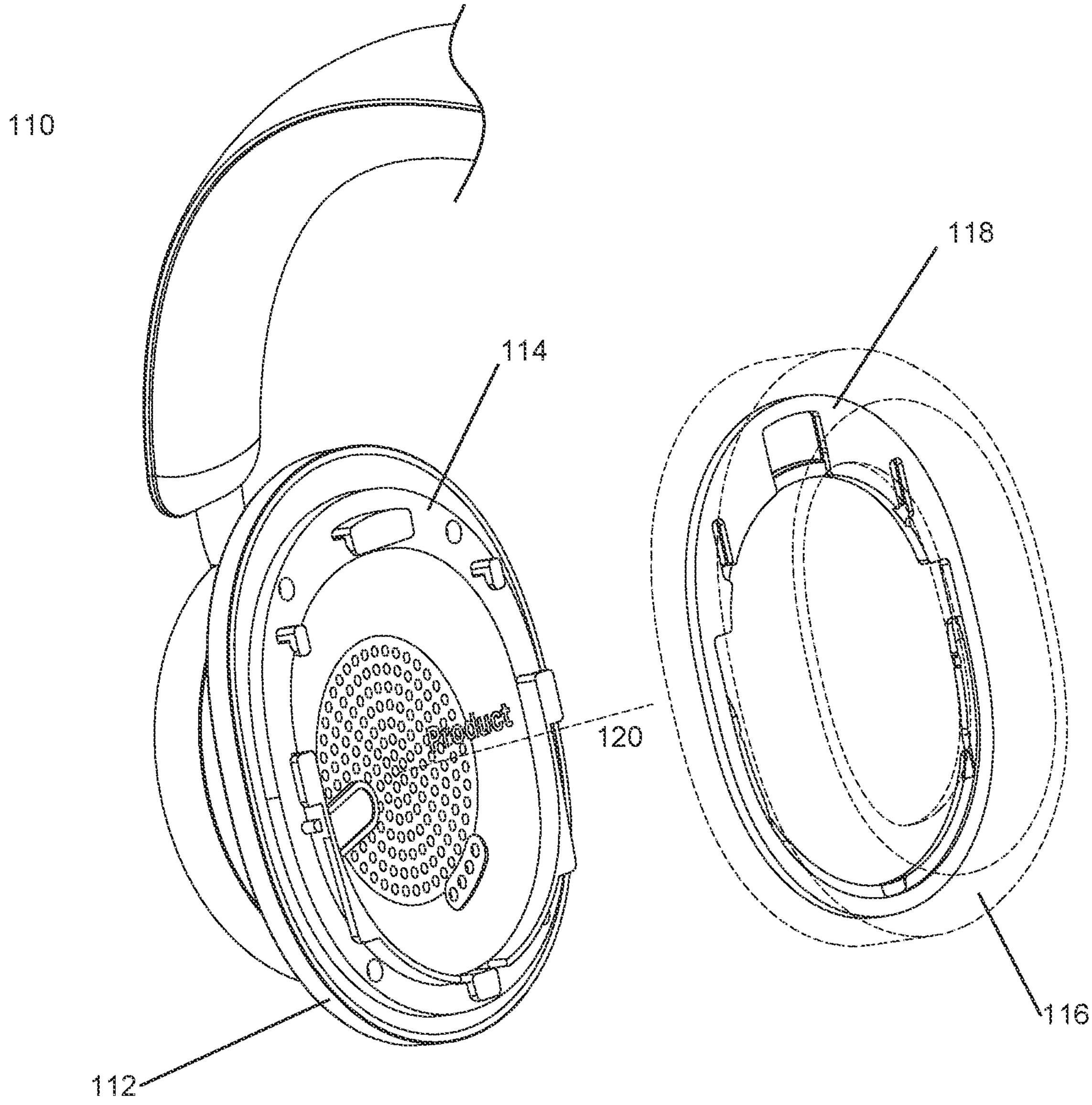
FIG. 10 illustrates a rear view of a headphone design in accordance with certain embodiments of the invention.

FIG. 6 is a message flow diagram illustrating data exchanges between devices of the media playback system 100 (FIGS. 1A-1M).

At step 650*a*, the media playback system 100 receives an indication of selected media content (e.g., one or more songs, albums, playlists, podcasts, videos, stations) via the control device 130*a*. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130*a* transmits a message 651*a* to the playback device 110*a* (FIGS. 1A-1C) to add the selected media content to a playback queue on the playback device 110*a*.

At step 650*b*, the playback device 110*a* receives the message 651*a* and adds the selected media content to the playback queue for play back.

At step 650*c*, the control device 130*a* receives input corresponding to a command to play back the selected media content. In response to receiving the input corresponding to the command to play back the selected media content, the control device 130*a* transmits a message 651*b* to the playback device 110*a* causing the playback device 110*a* to play back the selected media content. In response to receiving the message 651*b*, the playback device 110*a* transmits a message 651*c* to the computing device 106*a* requesting the selected media content. The computing device 106*a*, in response to receiving the message 651*c*, transmits a message 651*d* comprising data (e.g., audio data, video data, a URL, a URI) corresponding to the requested media content.

At step 650*d*, the playback device 110*a* receives the message 651*d* with the data corresponding to the requested media content and plays back the associated media content.

At step 650*e*, the playback device 110*a* optionally causes one or more other devices to play back the selected media content. In one example, the playback device 110*a* is one of a bonded zone of two or more players (FIG. 1M). The playback device 110*a* can receive the selected media content and transmit all or a portion of the media content to other devices in the bonded zone. In another example, the playback device 110*a* is a coordinator of a group and is configured to transmit and receive timing information from one or more other devices in the group. The other one or more devices in the group can receive the selected media content from the computing device 106*a*, and begin playback of the selected media content in response to a message from the playback device 110*a* such that all of the devices in the group play back the selected media content in synchrony.

IV. Ear Cushion Attachment to a Headphone

In some embodiments of the invention, at least one playback device is a wireless headphone having two or more speaker drivers and electronics for receiving, generating, and/or processing an audio signal such as those described above with respect to FIG. 1C. The speaker drivers may be housed in a left earcup and a right earcup that each also have an earpad for resting on a user's head. In several embodiments, the earcups are joined by a headband. In further embodiments, the wireless headphone is playback device that is also a network microphone device (NMD), equipped with a microphone, such as those described above with respect to FIG. 1F. These headphones may be utilized in a media playback system such as those illustrated in FIGS. 1A and 1B.

Playback of audio in a headphone typically utilizes one or more audio drivers within each earcup to create sound waves that travel to a user's ear. An ear cushion is usually attached to each earcup that helps to create a seal to keep sound waves from escaping when the ear cushion rests against the user's head. Often an ear cushion can degrade or wear out over time. Therefore, it can be useful for ear cushions to be removeable and replaceable. Attachment mechanisms in accordance with many embodiments of the invention can include one or more clips or hooks on an attachment frame and corresponding one or more slots in a receiver frame. The attachment frame can be on the earcup and the receiver frame can be on the ear cushion, or vice versa. Attachment frames and receiver frames for securing an ear cushion to an earcup of a headphone in accordance with embodiments of the invention are discussed in greater detail further below.

a. Structure

The structure of an audio headphone typically includes two earcups joined by a headband and in some cases connectors and/or joints from the headband to each earcup. Each earcup usually includes at least one audio driver and an ear cushion for resting against a user's ear or head. Earcup and ear cushion configurations are often one of two types: on-ear and over-ear. With an on-ear earcup and ear cushion, the cushion rests on a user's ear. With an over-ear earcup and ear cushion, the cushion encloses the ear and rests on a user's head. A headphone in accordance with an embodiment of the invention is illustrated in FIGS. 7-10. The headphone includes a headband. At the ends of the headband are two arms, each arm connects an earcup to the headband. An ear cushion is attached to the inner surface of each earcup.

Figure 11:
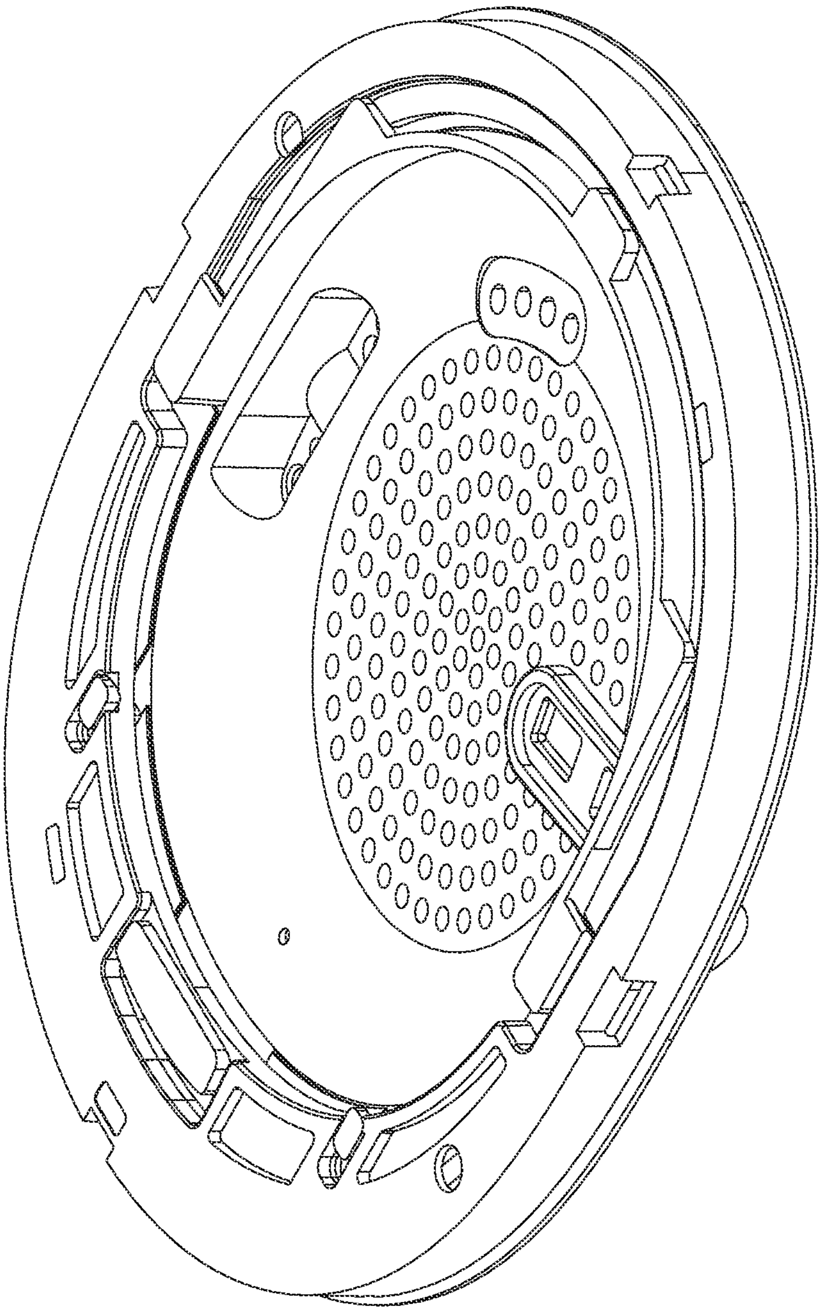
FIG. 11 illustrates a receiver frame of a headphone ear cushion and attachment frame of a headphone earcup in accordance with certain embodiments of the invention.

In many embodiments of the invention, an ear cushion can include a receiver frame configured to engage with an attachment frame on an earcup. FIG. 11 illustrates an ear cushion and earcup system 110 in accordance with an embodiment of the invention. The inside, or ear-facing side, of the earcup 112 includes an attachment frame 114. In many embodiments, the attachment frame can be shaped as a thin round ring (e.g., circular or elliptical) of uniform thickness (e.g., 1-2 mm). The attachment frame 114 includes protrusions that form male portions of attachment mechanisms that engage with (e.g., fit through, on, and/or over) female portions of a receiver frame, as will be discussed in greater detail further below.

Figure 12:
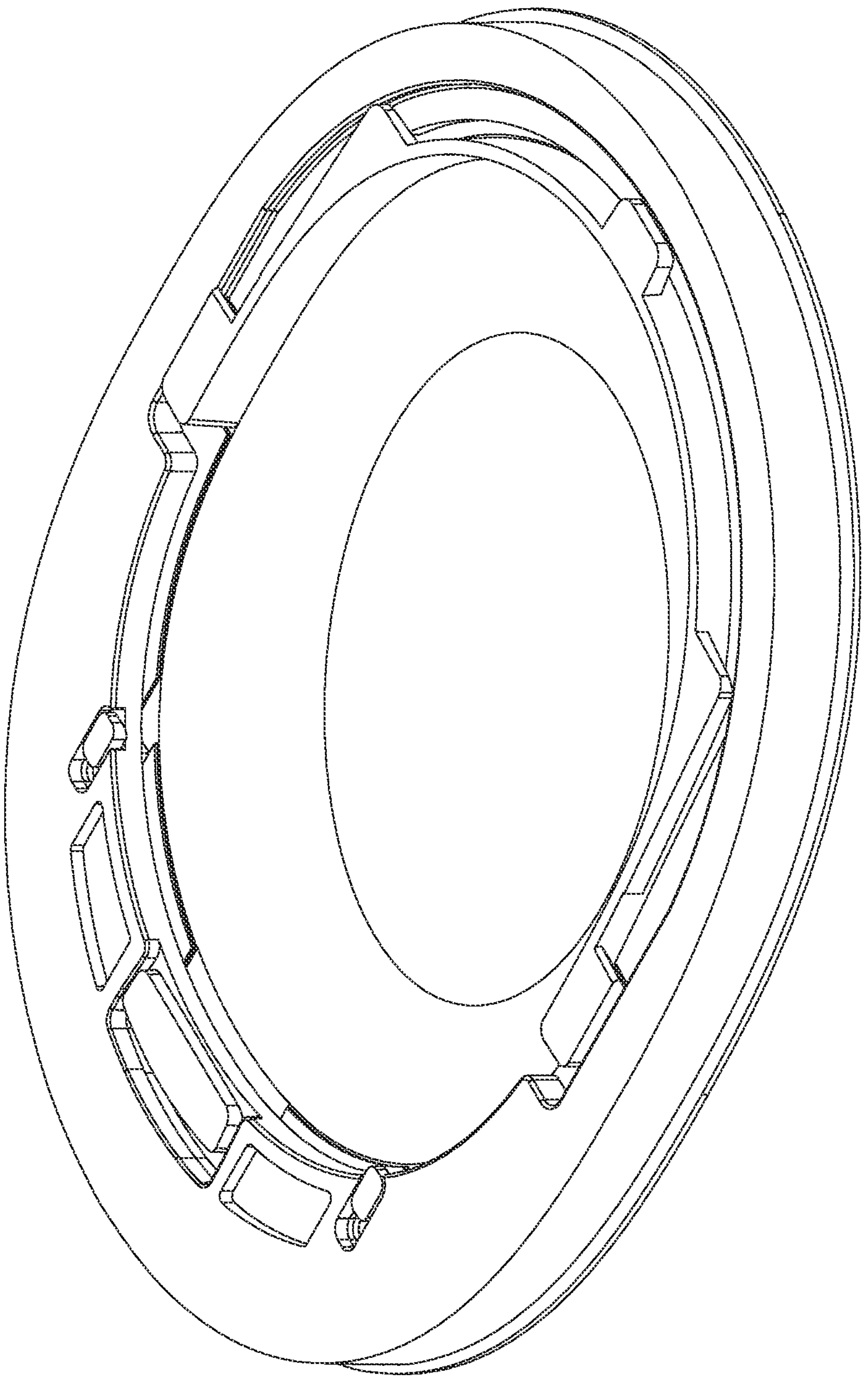
FIG. 12 illustrates a receiver frame of a headphone ear cushion engaged together with an attachment frame of a headphone earcup in accordance with certain embodiments of the invention.

The ear cushion 116 is shown separate here from the earcup 112 and is configured to fit together with earcup 112 generally in the direction shown by axis 120. Methods of attachment will be discussed further below. The ear cushion 116 includes a receiver frame 118 with female portions configured to engage with male portions of attachment frame 114, which will be described in greater detail further below. The cushion portion is shown transparent and in dashed lines for visibility of the receiver frame 118 within. FIG. 12 illustrates a receiver frame 118 and attachment frame 114 engaged together.

In many embodiments of the invention, the interface between an ear cushion and an earcup of a headphone is oval shaped. In some particular embodiments, the interface is circular.

The attachment frame in several embodiments of the invention includes one or more sliding hooks at one end of the earcup. In further embodiments, it can also include one or more retaining tabs. The sliding hooks and/or retaining tabs can pass through and/or engage with corresponding parts on the receiver frame.

Figure 15:
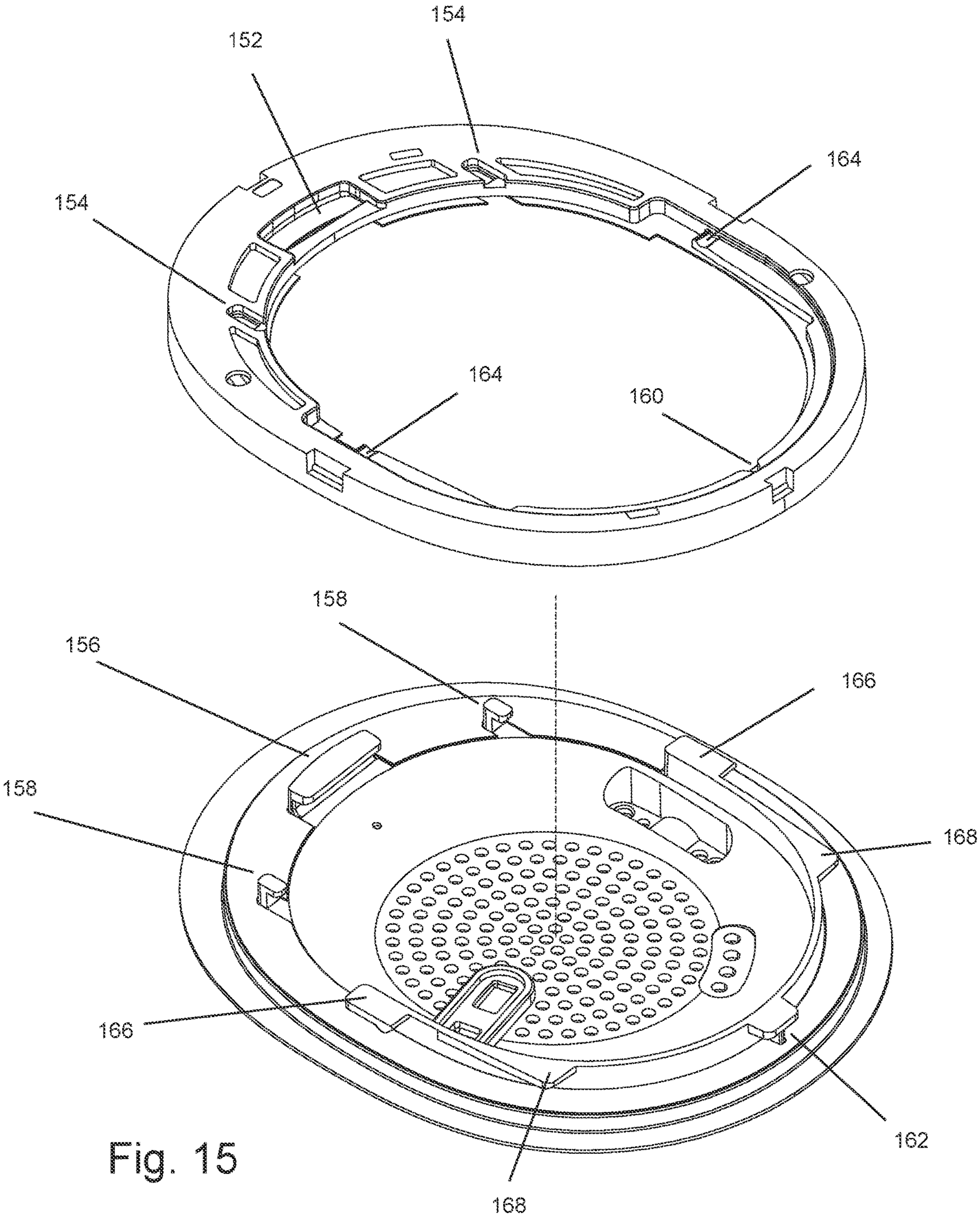
FIG. 15 illustrates a receiver frame of a headphone ear cushion and attachment frame of a headphone earcup in accordance with certain embodiments of the invention.

In many embodiments of the invention, a receiver frame can be shaped as a thin round ring (e.g., circular or elliptical) of uniform thickness (e.g., 1-2 mm). The receiver frame can have slots and/or notches configured to engage with sliding hooks and/or retaining tabs on an attachment frame. FIG. 15 shows some of the elements that may be present on the receiver frame and attachment frame.

A receiver frame can include top slots 152 and side slots 154 that can engage with corresponding top hook 156 and side hooks 158 in an attachment frame. A receiver frame can also include bottom shelf 160 that engages with bottom tab 162 in an attachment frame. Furthermore, side grooves 164 in a receiver frame can engage with side nubs 166 in an attachment frame. In certain embodiments, side grooves can be shaped as notches and side nubs can be shaped as outward-facing hooks. In this way, side nubs as outward-facing hooks can engage by passing through side notches and shifting perpendicularly so that the hook is offset from the slot.

In further embodiments of the invention, the attachment frame can also include guide tabs 168. Guide tabs 168 may form a corner or other shape that restricts the orientation of the attachment frame as it comes into proximity with the receiver frame so that other of the attachment features (e.g., top hook, sliding hooks, side nubs, etc.) align properly with their corresponding features (e.g., top slot, side slots, side grooves, etc.). The shape of the receiver frame may have a corresponding shape to allow the guide tabs 168 to pass through as the two parts come into proximity. The shape may be the curvature of the inner opening of the receiver frame, so that at a wider point of the opening the guide tabs may pass through.

As illustrated in the figures, one or more sliding hooks on an attachment frame can pass through corresponding slot(s) on a receiver frame, and when engaged can help prevent the pulling away of the receiver frame from the attachment frame. Similarly, one or more side nubs on an attachment frame can engage with corresponding side grooves on a receiver frame and help prevent the receiver frame from pulling away from the attachment frame.

Figure 13A:
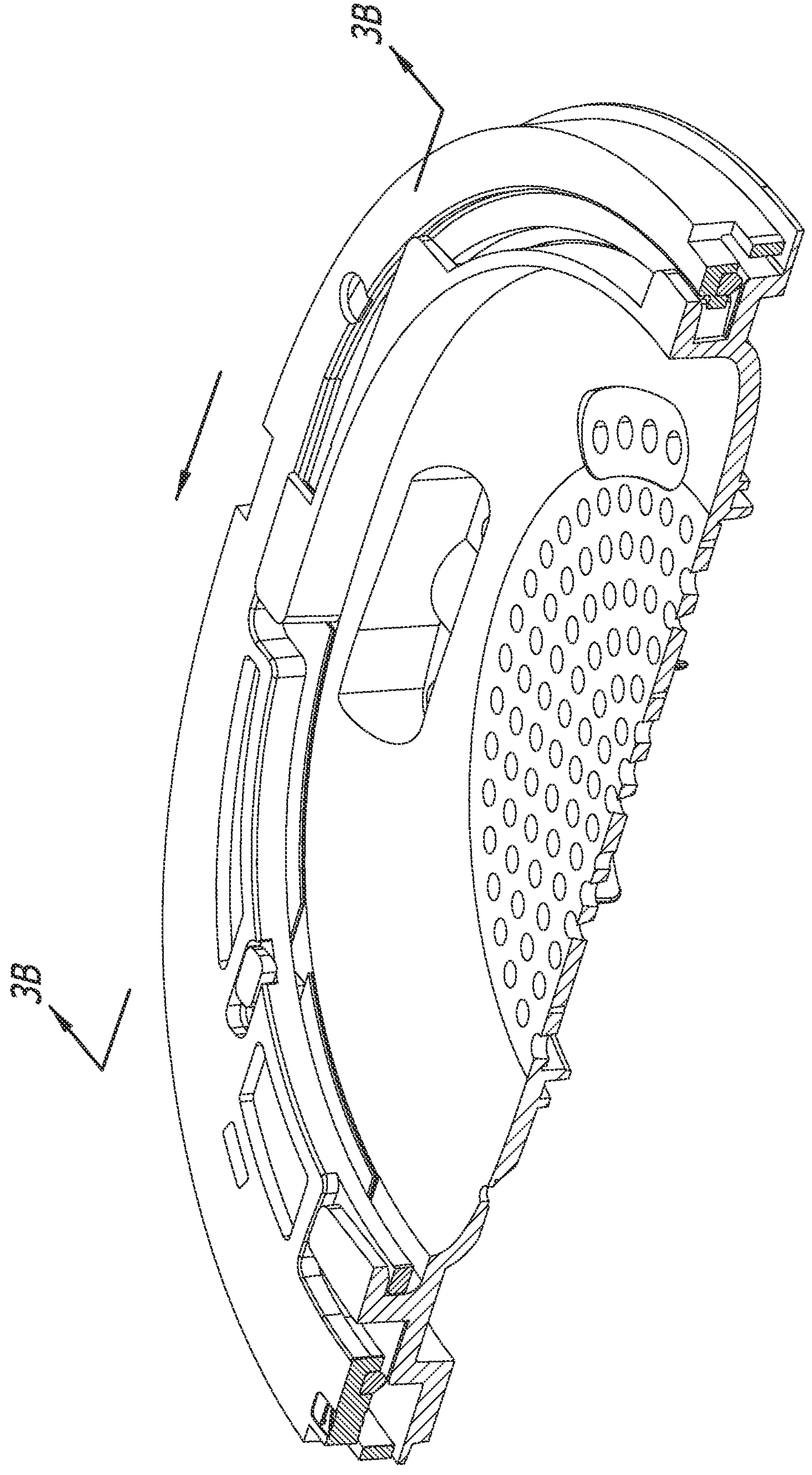
FIGS. 13A and 13B are cross sections illustrating a receiver frame of a headphone ear cushion engaged together with an attachment frame of a headphone earcup in accordance with certain embodiments of the invention.
Figure 13B:
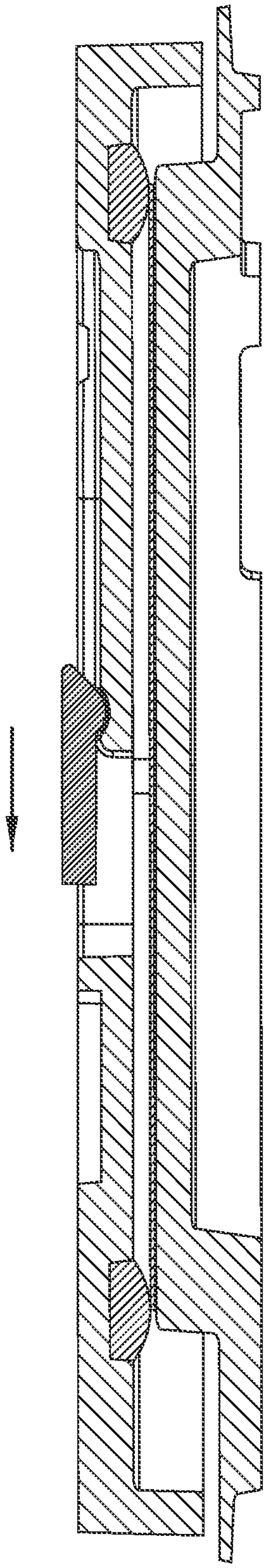
Figure 14A:
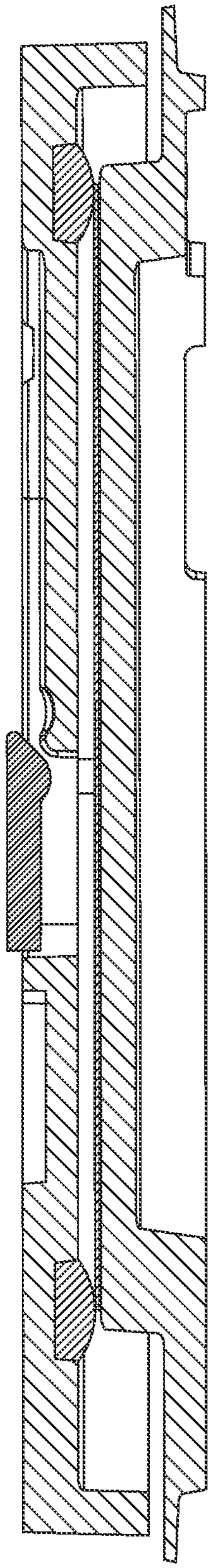
FIGS. 14A and 14B are cross sections illustrating a receiver frame of a headphone ear cushion disengaged from an attachment frame of a headphone earcup in accordance with certain embodiments of the invention.
Figure 14B:
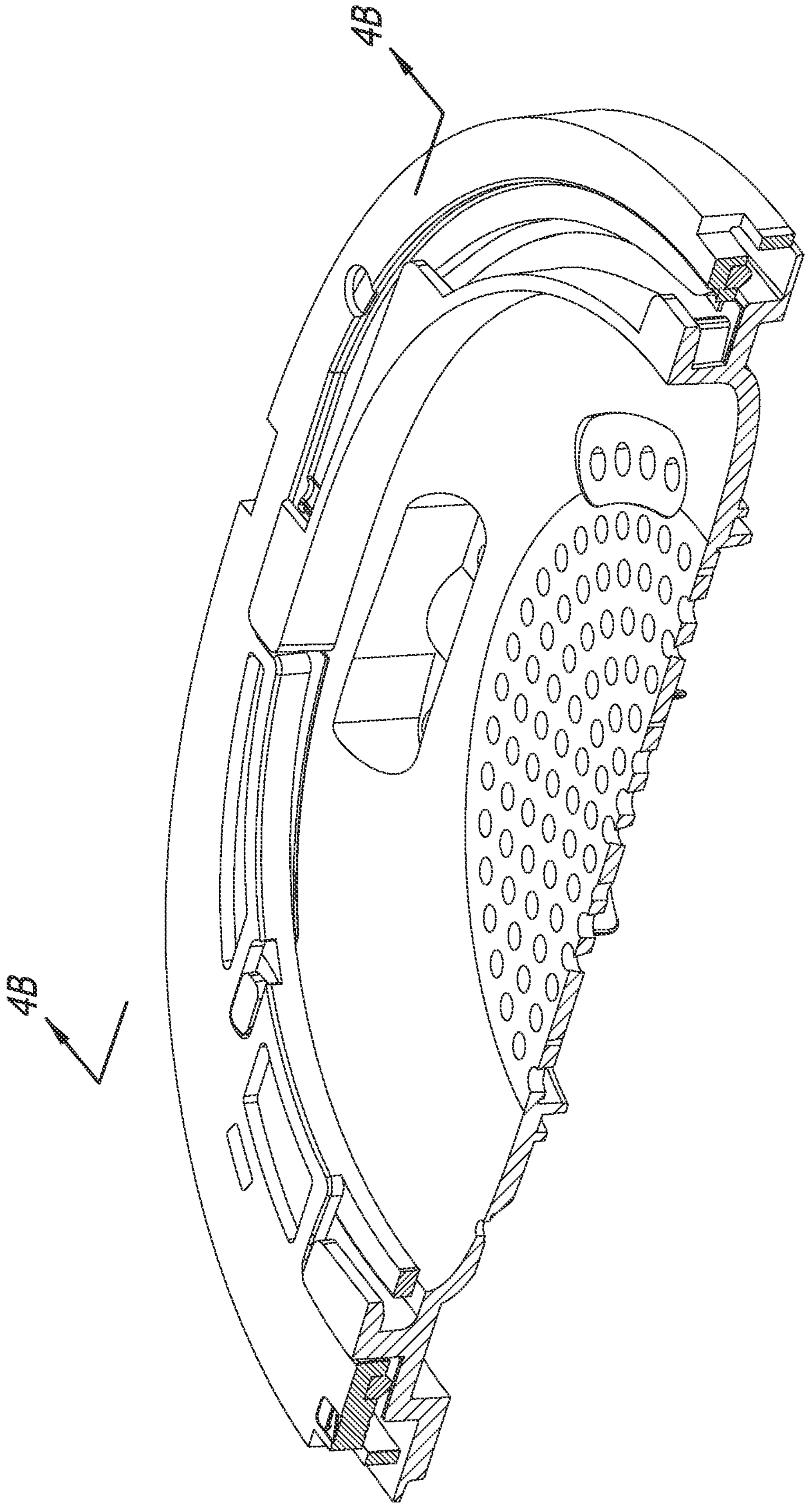

FIG. 13A is a cross section showing a receiver frame engaged to an attachment frame. FIG. 13B is another cross section showing engagement of a side nub with a side groove. FIGS. 14A and 14B are cross sections showing the side nub disengaged from the groove.

Figure 18:
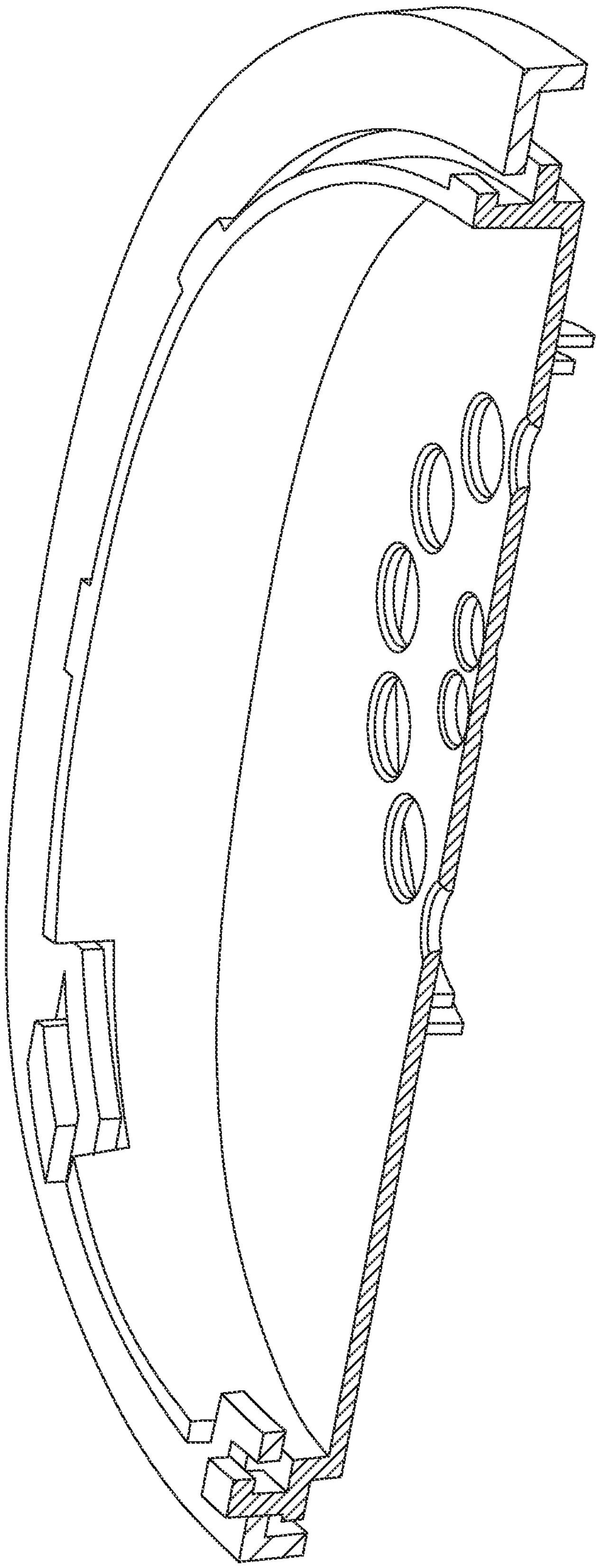
FIG. 18 is a cross section illustrating a receiver frame of a headphone ear cushion engaged together with an attachment frame of a headphone earcup in accordance with certain embodiments of the invention.
Figure 19:
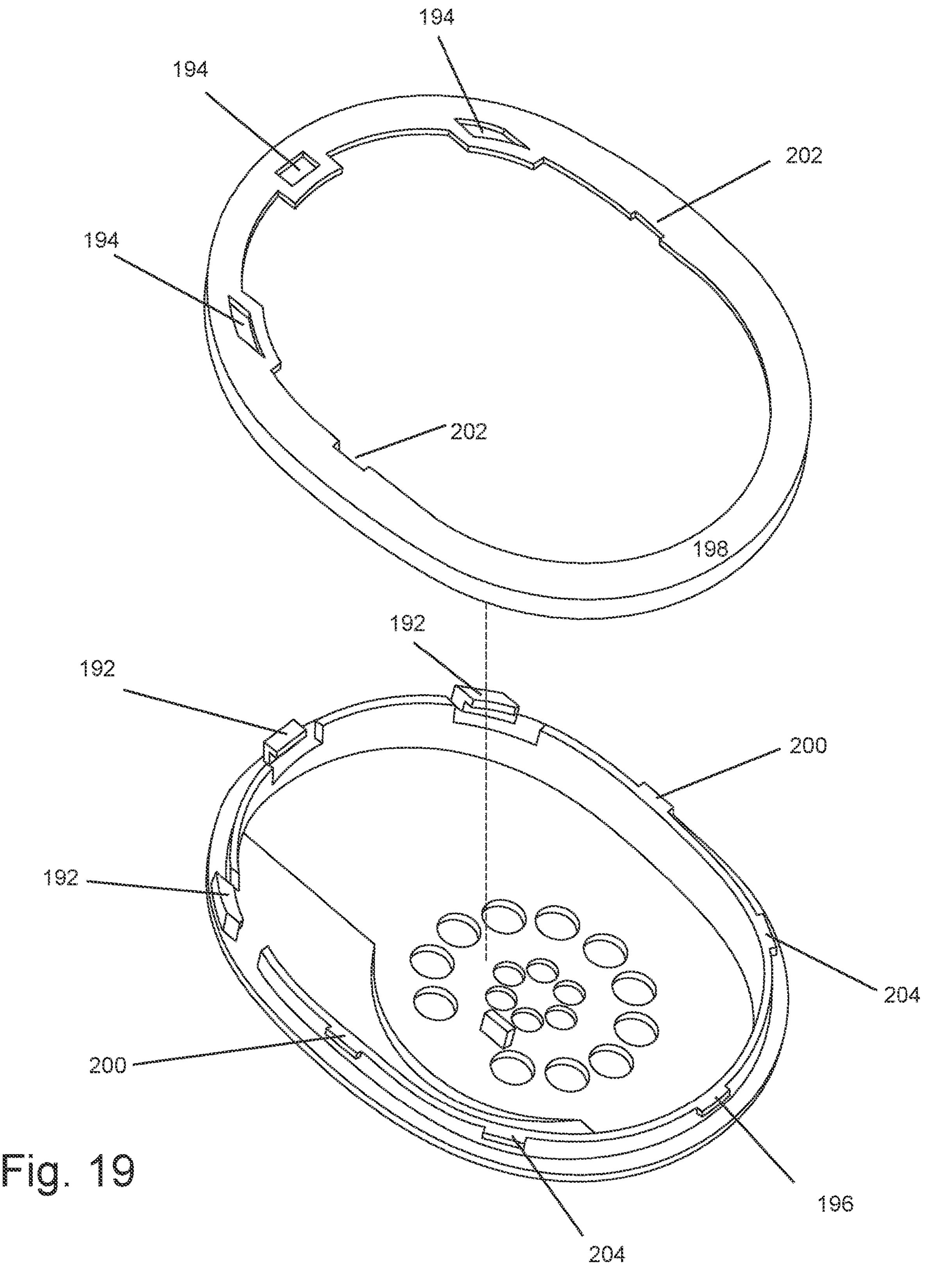
FIG. 19 illustrates a receiver frame of a headphone ear cushion and attachment frame of a headphone earcup separately in accordance with certain embodiments of the invention.

FIG. 19 illustrates separately a receiver frame (top) and attachment frame (bottom) in accordance with another embodiment of the invention. The attachment frame has three sliding hooks 192 on one end and the receiver frame has three corresponding slots 194. The attachment frame has a bottom tab 196 that engages with a bottom shelf 198 on the receiver frame, side tabs 200 that engage with side notches 202 on the receiver frame, and guide tabs 204 that align the attachment frame as it comes close to the receiver frame before sliding to engage. FIGS. 16 and 17 show the receiver frame and attachment frame together and a direction of sliding to engage. FIG. 18 is a cross section showing the receiver frame and attachment frame assembly. Although specific structures for a sliding lock receiver frame and attachment frame assembly are described above, one skilled in the art will recognize that any number of variations of structures may be utilized in accordance with embodiments of the invention.

b. Rotational Lock

Figure 20:
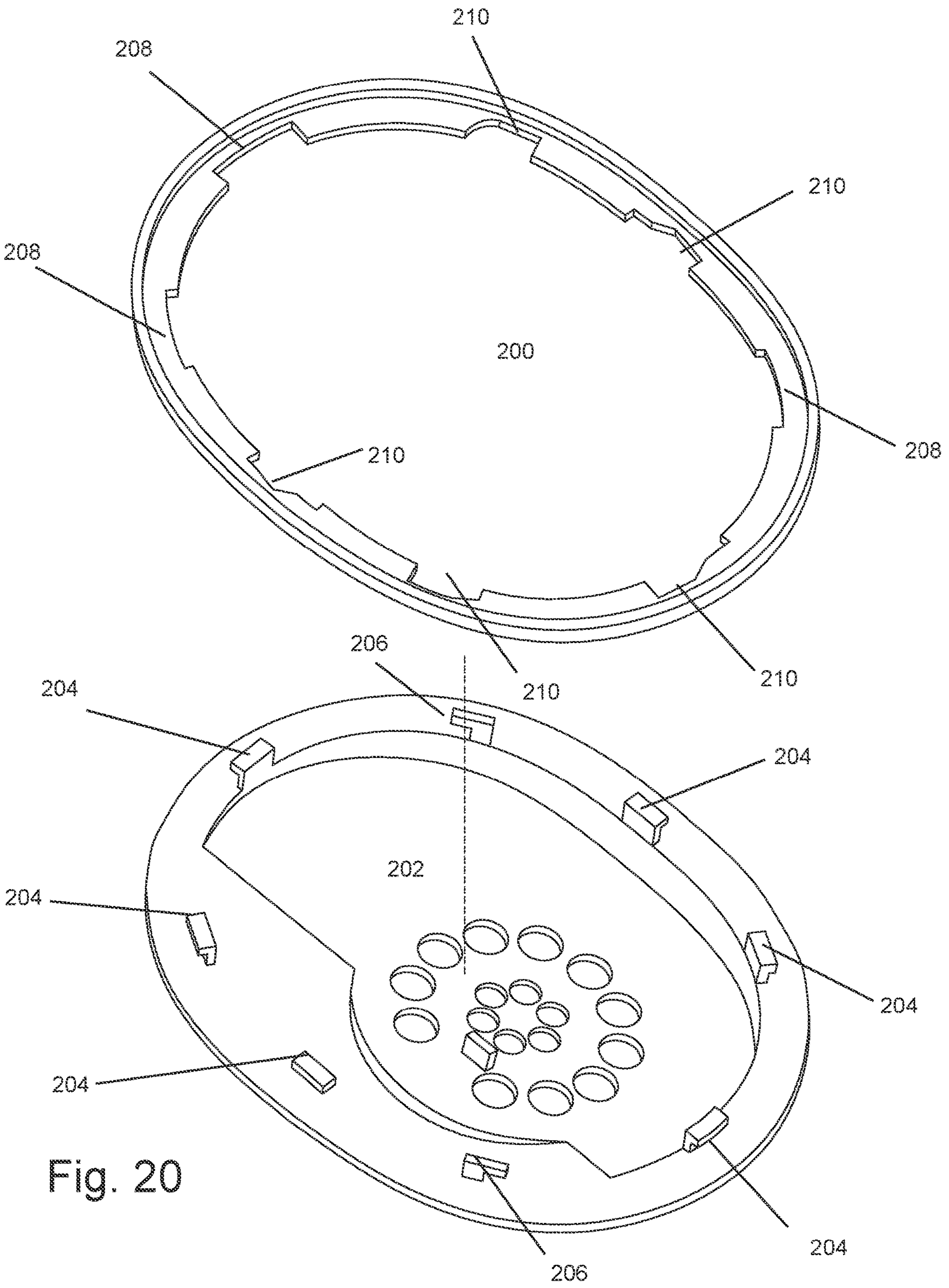
FIG. 20 illustrates a receiver frame of a headphone ear cushion and attachment frame of a headphone earcup with rotational lock separately in accordance with certain embodiments of the invention.
Figure 21:
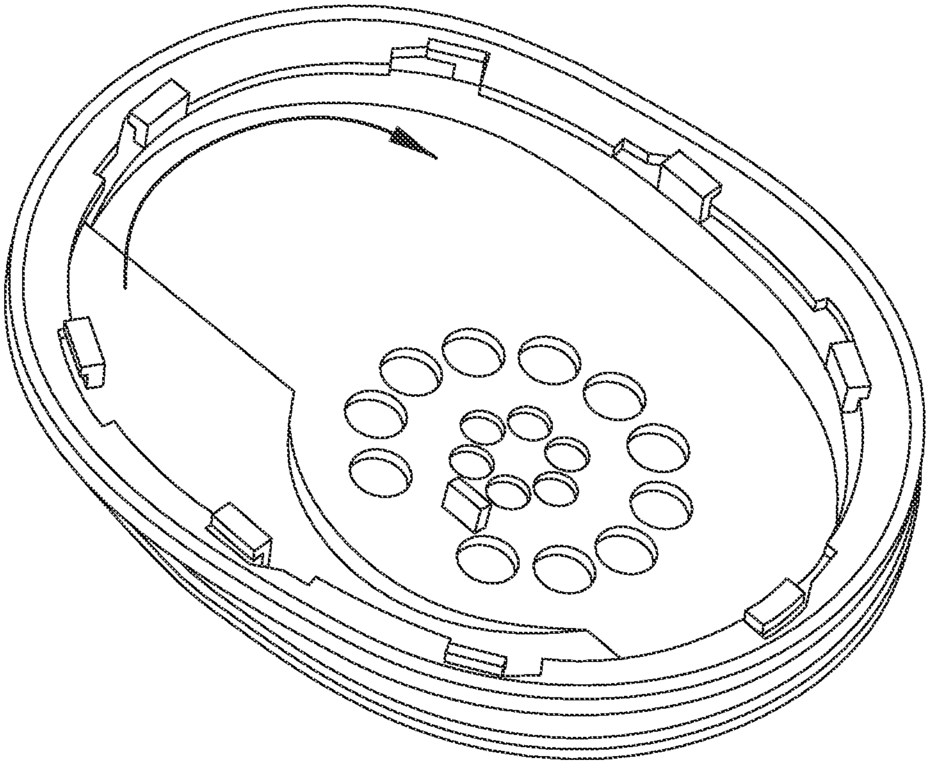
FIGS. 21 and 22 illustrate two stages of engagement of a receiver frame of a headphone ear cushion and attachment frame of a headphone earcup with rotational lock in accordance with certain embodiments of the invention.
Figure 22:
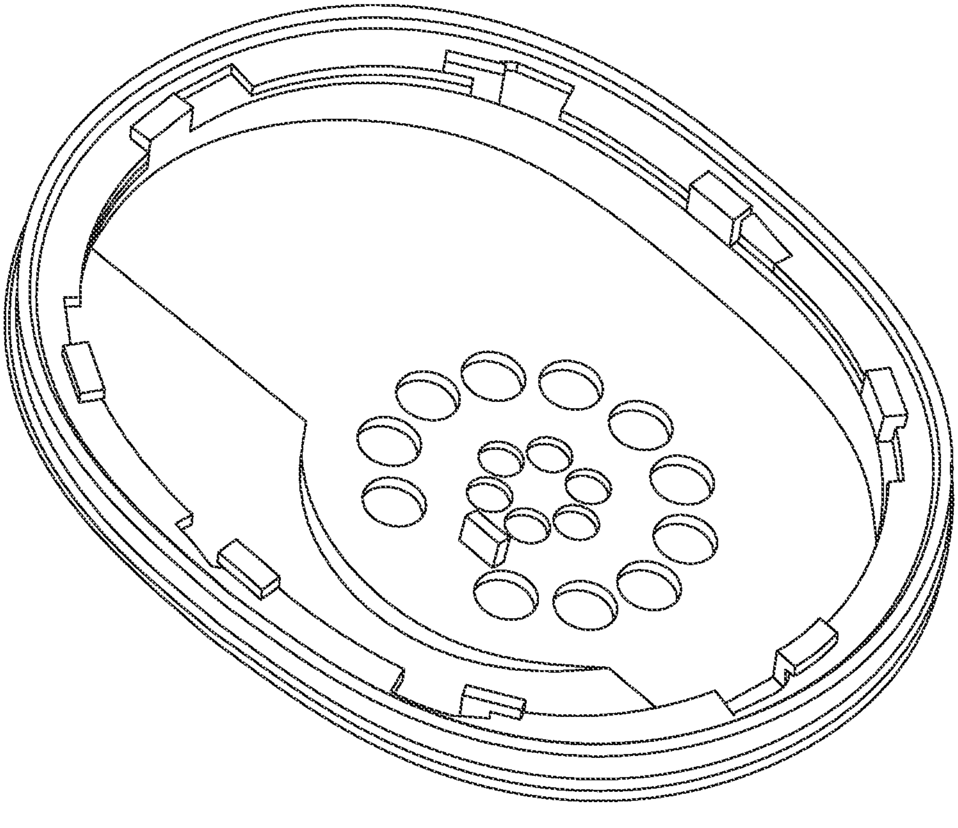
Figure 23:
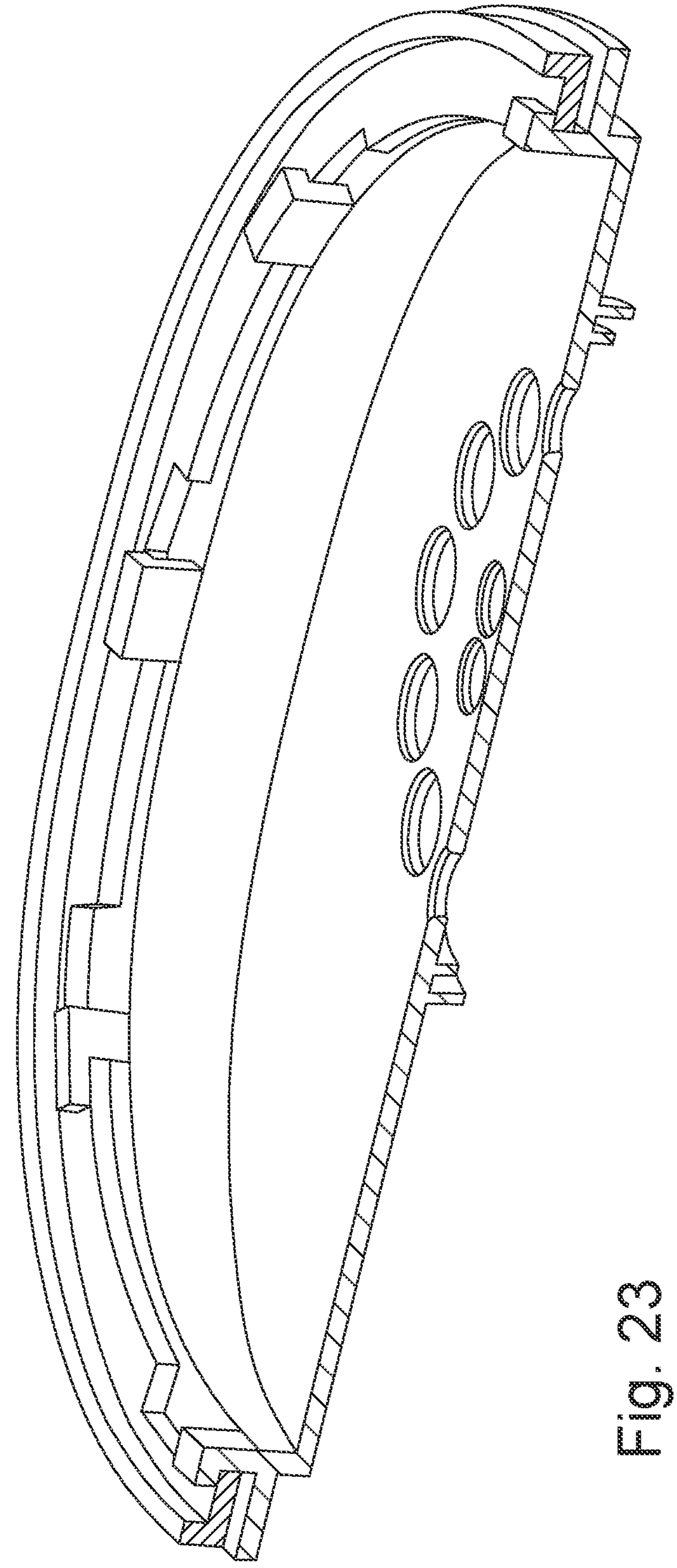
FIG. 23 is a cross section illustrating a receiver frame of a headphone ear cushion engaged together with an attachment frame of a headphone earcup with rotational lock in accordance with certain embodiments of the invention.
Figure 24:
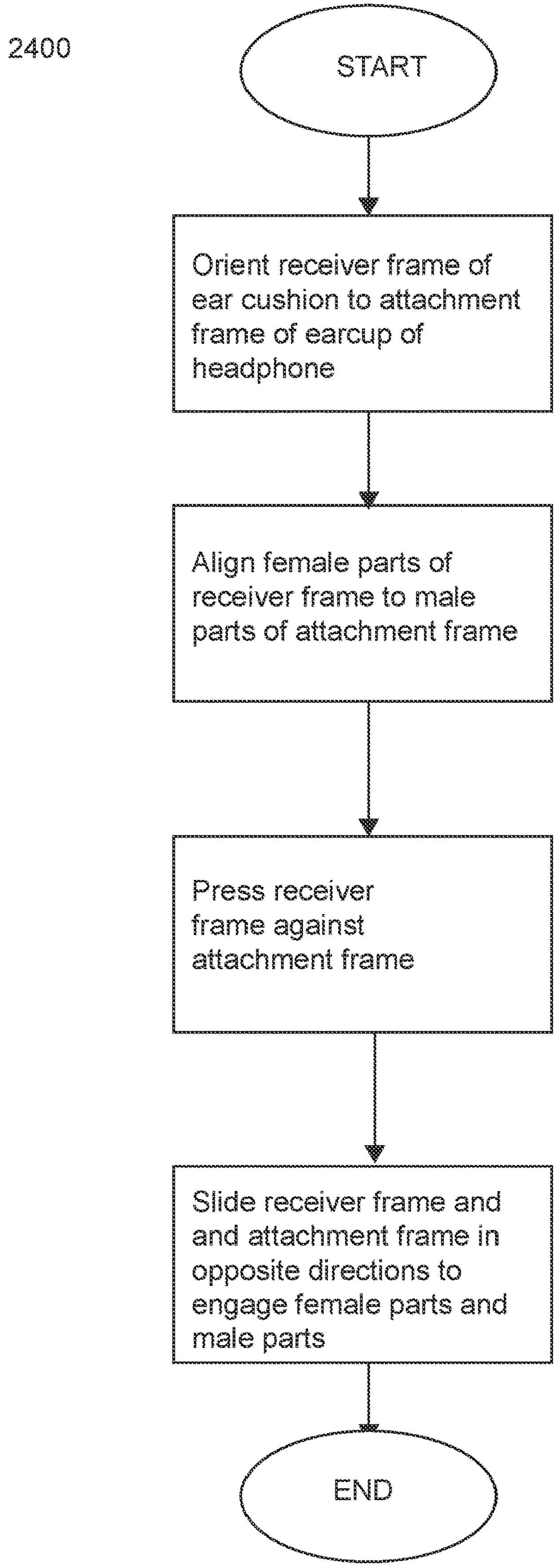
FIG. 24 illustrates a process for attaching a receiver frame of a headphone ear cushion to an attachment frame of a headphone earcup in accordance with certain embodiments of the invention.

A sliding type lock in accordance with certain embodiments of the invention is discussed above. Another mechanism that may be utilized in accordance with further embodiments is a rotational lock. Two or more tabs and/or hooks in a rotational lock configuration may face in a rotational direction. One such design illustrated in accordance with some embodiments of the invention is illustrated in FIGS. 20-23. FIG. 20 shows the pieces separately with the receiver frame above and the attachment frame below. FIG. 21 illustrates a receiver frame and an attachment frame that have been brought together so that the tabs in the attachment frame align with openings in the receiver frame, but rotationally out of alignment with each other. A direction of rotation to engage the pieces is shown with an arrow. FIG. 22 illustrates the pieces aligned after rotating in the direction shown. The tabs are out of alignment with the openings and engaged to secure the receiver frame in place. A cross section is shown in FIG. 23. As can be seen in the figures, one or more outward-facing hooks 204 may engage with one or more notches. One or more tangentially-facing hooks 206 (i.e., in a direction approximately tangential to the curvature of the frame) may engage with one or more notches. The outward-facing hooks 204 can act to keep the frames centered in position, while the tangentially-facing hooks 206 can act to lock the frames together and inhibit further movement.

Although specific examples of a rotational lock are described above, one skilled in the art will recognize that any number of variations of structures may be utilized in accordance with embodiments of the invention.

c. Processes for Ear Cushion Attachment

As discussed above, in many embodiments of the invention, an ear cushion can include a receiver frame configured to engage with an attachment frame on an earcup. Alternatively, in other embodiments of the invention, an ear cushion can include an attachment frame and a corresponding earcup can include a receiver frame.

Methods of utilizing the features of an attachment frame and a receiver frame to secure an ear cushion to an earcup are discussed below with reference to FIGS. 3A, 3B, 4A, 4B, and 24.

The process 2400 includes orienting (2402) an ear cushion proximate to, but not touching, an earcup. The ear cushion includes a receiver ring having an arrangement of two or more slots and/or notches such as in the configurations described further above. The earcup includes an attachment ring having an arrangement of two or more hooks and/or tabs corresponding to the slots in the receiver ring such as in the configurations described further above.

The process proceeds to align (2404) the first slot in the receiver frame with the first inward-facing hook on the attachment frame and align the first notch in the receiver frame with the first outward-facing hook and the second notch with the second outward-facing hook in the attachment frame.

The process includes pressing (2406) the flat face of the receiver frame against the flat face of the attachment frame such that the first inward-facing hook passes through the first slot, the first outward-facing hook passes through the first notch, and the second outward-facing hook passes through the second notch.

The process proceeds to sliding (2408) the receiver frame in the direction from the third outward-facing hook to the first inward-facing hook relative to the attachment frame until the parts engage. Engagement can include, for example, the hooks and/or other portions of the attachment frame contacting portions of the receiver frame in the areas of the corresponding slots in a way that it inhibits further movement.

Although a specific process is described above with respect to FIG. 24, one skilled in the art will recognize that any of a variety of processes may be utilized in accordance with embodiments of the invention. Furthermore, more parts on the receiver frame and/or attachment frame can be included as discussed further above and the additional parts can also engage for securing the ear cushion to the earcup.

V. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

What is claimed is:

1. A method for securing a headphone ear cushion to a headphone earcup, the method comprising:

orienting an ear cushion proximate to, but not touching, an earcup;

where the ear cushion comprises an attachment ring comprising:

a first elliptical ring having a flat face;

a first notch, a second notch, a third notch, and a fourth notch along the inner edge of the first elliptical ring;

where the earcup comprises an attachment receiving interface comprising:

a second elliptical ring having a flat face;

a first outward-facing hook, a second outward-facing hook, a first tangentially-facing hook, and a second tangentially-facing hook;

aligning the first notch in the attachment ring with the first outward-facing hook on the attachment receiving interface, the second notch with the second outward-facing hook, the third notch with the first tangentially-facing hook, and the fourth notch with the second tangentially-facing hook;

pressing the flat face of the first elliptical ring against the flat face of the second elliptical ring such that the first outward-facing hook pass through the first notch, the second outward-facing hook passes through the second notch, the first tangentially-facing hook passes through the third notch, and the second tangentially-facing hook passes through the fourth notch; and rotating the first elliptical ring relative to the second elliptical ring in a direction such that each of the hooks of the attachment receiving interface engage with a flat portion of the attachment ring.

2. The method of claim 1:

wherein the headphone further comprises wireless receiver circuitry; and wherein the earcup further comprises a speaker driver; and the method further comprises:

receiving a wireless audio data signal by the wireless receiver circuitry;

decoding the wireless audio data signal to generate an analog audio signal; and playing back the analog audio signal through the speaker driver.

3. The method of claim 2 wherein the wireless receiver circuitry is configured to communicate using a Bluetooth protocol.

4. The method of claim 2, wherein the wireless receiver circuitry is configured to communicate using a WiFi protocol.

5. An audio-playback headphone comprising:

an ear cushion comprising an attachment ring, the attachment ring comprising:

a first elliptical ring having a flat face, a first notch, a second notch, a third notch, and a fourth notch along the inner edge of the first elliptical ring;

an earcup comprising a speaker driver and an attachment receiving interface, the attachment receiving interface comprising:

a second elliptical ring having a flat face, a first outward-facing hook, a second outward-facing hook, a first tangentially-facing hook, and a second tangentially-facing hook;

where the flat face of the first elliptical ring contacts against the flat face of the second elliptical ring in an orientation such that the first outward-facing hook pass through the first notch, the second outward-facing hook passes through the second notch, the first tangentially-facing hook passes through the third notch, and the second tangentially-facing hook passes through the fourth notch; and wherein each of the hooks of the attachment receiving interface engage with a flat portion of the attachment ring.

6. The headphone of claim 5:

wherein the headphone further comprises wireless receiver circuitry; and wherein the earcup further comprises a speaker driver; and the wireless receiver circuitry is configured to:
receive a wireless audio data signal;
decode the wireless audio data signal to generate an analog audio signal; and
play back the analog audio signal through the speaker driver.

7. The headphone of claim 6, wherein the wireless receiver circuitry is configured to communicate using a Bluetooth protocol.

8. The headphone of claim 6, wherein the wireless receiver circuitry is configured to communicate using a WiFi protocol.

* * * * *